(12) United States Patent
Hersans et al.

(10) Patent No.: US 11,700,112 B2
(45) Date of Patent: *Jul. 11, 2023

(54) DISTRIBUTED KEY CACHING FOR ENCRYPTED KEYS

(71) Applicant: salesforce.com, inc., San Francisco, CA (US)

(72) Inventors: Alexandre Hersans, San Francisco, CA (US); John Bracken, San Francisco, CA (US); Assaf Ben Gur, San Francisco, CA (US); William Charles Mortimore, Jr., San Francisco, CA (US); Swaroop Shere, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,402

(22) Filed: Apr. 30, 2020

(65) Prior Publication Data

US 2020/0322139 A1 Oct. 8, 2020

Related U.S. Application Data

(63) Continuation of application No. 15/716,677, filed on Sep. 27, 2017, now Pat. No. 10,680,804.

(51) Int. Cl.
*H04L 9/08* (2006.01)
*H04L 9/14* (2006.01)
(Continued)

(52) U.S. Cl.
CPC ........ *H04L 9/0822* (2013.01); *G06F 12/0813* (2013.01); *G06F 12/123* (2013.01);
(Continued)

(58) Field of Classification Search
CPC ....... H04L 9/0822; H04L 9/0894; H04L 9/14; G06F 12/123; G06F 12/0813;
(Continued)

(56) References Cited

U.S. PATENT DOCUMENTS 6,711,263 B1 * 3/2004 Nordenstam ......... H04L 9/0825
380/278
9,379,890 B1 * 6/2016 Blakely ................. H04L 9/0897
(Continued)

*Primary Examiner* — Abu S Sholeman
(74) *Attorney, Agent, or Firm* — Holland & Hart LLP

(57) ABSTRACT

Methods, systems, and devices for distributed caching of encrypted encryption keys are described. Some multi-tenant database systems may support encryption of data records. To efficiently handle multiple encryption keys across multiple application servers, the database system may store the encryption keys in a distributed cache accessible by each of the application servers. To securely cache the encryption keys, the database system may encrypt (e.g., wrap) each data encryption key (DEK) using a second encryption key (e.g., a key encryption key (KEK)). The database system may store the DEKs and KEKs in separate caches to further protect the encryption keys. For example, while the encrypted DEKs may be stored in the distributed cache, the KEKs may be stored locally on application servers. The database system may further support "bring your own key" (BYOK) functionality, where a user may upload a tenant secret or tenant-specific encryption key to the database.

18 Claims, 16 Drawing Sheets

(51) Int. Cl.
*G06F 12/123* (2016.01)
*G06F 12/0813* (2016.01)

(52) U.S. Cl.
CPC .............. *H04L 9/0894* (2013.01); *H04L 9/14* (2013.01); *G06F 2212/60* (2013.01); *G06F 2212/62* (2013.01)

(58) Field of Classification Search
CPC ............. G06F 2212/62; G06F 2212/60; G06F 12/0875; G06F 2212/261
See application file for complete search history.

(56) References Cited

U.S. PATENT DOCUMENTS

| | | | | |
|---|---|---|---|---|
| 10,003,584 | B1* | 6/2018 | Roth | H04L 9/0897 |
| 2002/0091927 | A1* | 7/2002 | Wall | G06Q 20/3674 |
| | | | | 713/176 |
| 2002/0124176 | A1* | 9/2002 | Epstein | G06Q 20/341 |
| | | | | 713/168 |
| 2003/0163684 | A1* | 8/2003 | Fransdonk | H04L 63/0823 |
| | | | | 713/153 |
| 2005/0132226 | A1* | 6/2005 | Wheeler | H04L 9/0822 |
| | | | | 726/4 |
| 2011/0010415 | A1* | 1/2011 | Kodama | G06F 16/9535 |
| | | | | 715/763 |
| 2011/0320815 | A1* | 12/2011 | Matsunaka | H04L 63/065 |
| | | | | 713/168 |
| 2012/0054444 | A1* | 3/2012 | Wang | G06F 16/27 |
| | | | | 711/E12.001 |
| 2012/0072470 | A1* | 3/2012 | Joseph | G06F 16/24552 |
| | | | | 711/143 |
| 2013/0124866 | A1* | 5/2013 | Farrugia | H04L 9/0825 |
| | | | | 713/171 |
| 2014/0337614 | A1* | 11/2014 | Kelson | H04L 63/20 |
| | | | | 713/152 |
| 2015/0019812 | A1* | 1/2015 | Ban | G06F 16/273 |
| | | | | 711/122 |
| 2015/0106620 | A1* | 4/2015 | Cabrera | H04L 63/0884 |
| | | | | 713/168 |
| 2016/0261408 | A1* | 9/2016 | Peddada | H04L 9/0861 |
| 2016/0342814 | A1* | 11/2016 | Wang | G06F 21/64 |
| 2016/0360001 | A1* | 12/2016 | Wang | H04L 67/568 |
| 2017/0039145 | A1* | 2/2017 | Wu | G06F 12/1466 |
| 2017/0213054 | A1* | 7/2017 | Chen | H04L 9/083 |
| 2018/0157690 | A1* | 6/2018 | Kabiljo | H04W 4/21 |

* cited by examiner

DISTRIBUTED KEY CACHING FOR ENCRYPTED KEYS

CROSS REFERENCES

The present Application for Patent is a continuation of U.S. patent application Ser. No. 15/716,677 by Hersans et al., entitled "DISTRIBUTED KEY CACHING FOR ENCRYPTED KEYS," filed Sep. 27, 2017, assigned to the assignee hereof.

FIELD OF TECHNOLOGY

The present disclosure relates generally to database systems and data processing, and more specifically to distributed key caching for encrypted keys.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the database may support encryption, and may manage multiple encryption keys for different users or tenants. Utilizing many encryption keys across multiple servers within the database system may lead to inefficiencies and security risks (e.g., the database system may not be able to efficiently delete all versions of an encryption key across all application servers upon receiving a key destruction request). Additionally, certain users or tenants may require different security protocols than those provided by an encryption key derivation service of the database system.

DETAILED DESCRIPTION

Figure 1:
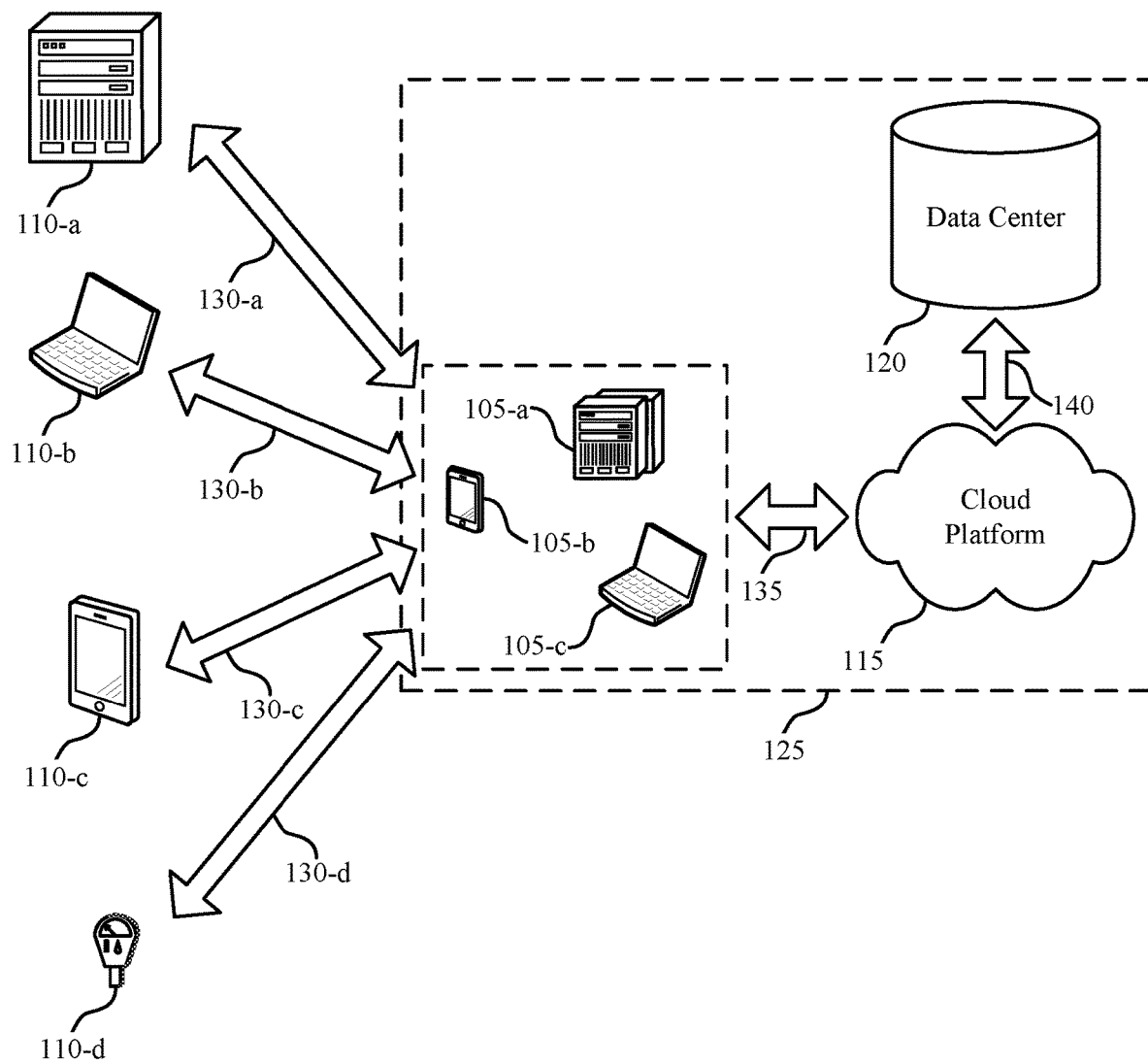
FIG. 1 illustrates an example of a system for data encryption that supports distributed key caching for encrypted keys in accordance with aspects of the present disclosure.

In some database systems, a data center may support encrypting data records for increased security. The data encryption may be based on security protocols, and may be performed on a tenant-by-tenant basis in a multi-tenant system (e.g., according to security options selected by each tenant). To efficiently and securely support data encryption for multiple tenants using different encryption keys, the data center may implement a distributed cache for caching encryption keys. For example, any workers or servers operating within the data center may access a single copy of the encryption key stored in the distributed cache. To securely store the encryption keys in the distributed cache, the data center may encrypt (e.g., wrap) each encryption key using a second encryption key, and may store the ciphertext (i.e., encrypted) version of the encryption key. The encryption keys for encrypting or decrypting data records may be referred to as data encryption keys (DEKs) or derived encryption keys, and the encryption keys for encrypting or decrypting the DEKs may be referred to as key encryption keys (KEKs). The data center may store the encrypted DEKs and KEKs separately (e.g., in the distributed cache and in local application server caches, respectively).

For an application at a user device to access a DEK for either encryption or decryption, the user device may send a request message for the DEK—or for a DEK associated with a specific tenant or tenant secret—to the data center. An application server at the data center may receive the request message and may send the request message on to the distributed cache. The distributed cache may return the requested encrypted DEK in response, for example, based on retrieving a tenant secret from a central database and retrieving the encrypted DEK from distributed cache storage or a key derivation server. The application server may retrieve a corresponding KEK (e.g., from a local key cache or the key derivation server), and may decrypt (e.g., unwrap) the encrypted DEK. The application server may then perform a cryptographic operation using the plaintext version of the DEK based on the request message from the user device. For example, the application server may decrypt one or more data records using the DEK, transmit the decrypted records to the user device in response to the request message, and delete the DEK from the application server as soon as the request procedure is complete.

The data center may additionally support "bring your own key" (BYOK) and key or tenant secret destruction functionality. For example, a user device may upload a tenant secret or a tenant-specific encryption key to the data center using a request-based pull operation, a push operation, or a time-based expiry operation. Additionally or alternatively, the user device may transmit a destruction request message corresponding to a secret or an encryption key to the data center, and the data center may destroy or mark for deletion the specified tenant secret, tenant-specific encryption key, or both, in response. The destruction process may efficiently remove all copies of the secret or encryption key from the data center, as the data center may only store a single copy of the tenant secret in a central database and a single copy of the tenant-specific encryption key in a distributed cache.

Aspects of the disclosure are initially described in the context of an environment supporting an on-demand database service. Additional aspects are described with respect to database systems and architectures, as well as a process flow for deletion. Aspects of the disclosure are further illustrated by and described with reference to apparatus diagrams, system diagrams, and flowcharts that relate to distributed key caching for encrypted keys.

FIG. 1 illustrates an example of a system 100 for cloud computing that supports distributed key caching for encrypted keys in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system.

In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, data center 120 may implement data encryption to protect stored data files. The data encryption may be based on security protocols or tenant-specific security options (e.g., in a multi-tenant database system). To efficiently and securely support data encryption for multiple tenants using different encryption keys, the data center 120 may implement a distributed cache for caching encryption keys. For example, encryption keys stored in the distributed cache may be accessible by any workers or servers operating in data center 120. In this way, data center 120 may store a single copy of an encryption key in the distributed cache, and the encryption key may be accessible for many different applications and servers.

To securely store the encryption key in the distributed cache, the data center 120 may encrypt the encryption key (e.g., a DEK) using a second encryption key (e.g., a KEK). Data center 120 may not store any unencrypted version of the DEK, and may instead just store the encrypted DEK in the distributed cache. Data center 120 may store a copy of the KEK in any application server that accesses the DEK in order to decrypt and derive the plaintext or unwrapped version of the DEK. The encrypting of the DEK, as well as derivation of the DEK or KEK may be performed by a key derivation server within data center 120. Additionally, data center 120 may support BYOK functionality. For example, a cloud client 105 may upload a tenant secret or tenant-specific encryption key, rather than use secrets or keys generated by the data center 120. The cloud client 105 may also send a destruction command to data center 120 for either a tenant secret or encryption key, and data center 120 may delete the corresponding secret (e.g., from a central database) or key (e.g., from the distributed cache) based on the command. In some cases, this process may include deleting any backed-up versions of the secret or key stored elsewhere (e.g., at a separate disaster recovery (DR) data center). As only one copy of each secret or key is stored in data center 120, this destruction process may be performed efficiently and the cloud client 105 may be confident that no version of the secret or key remains elsewhere in data center 120.

Figure 2:
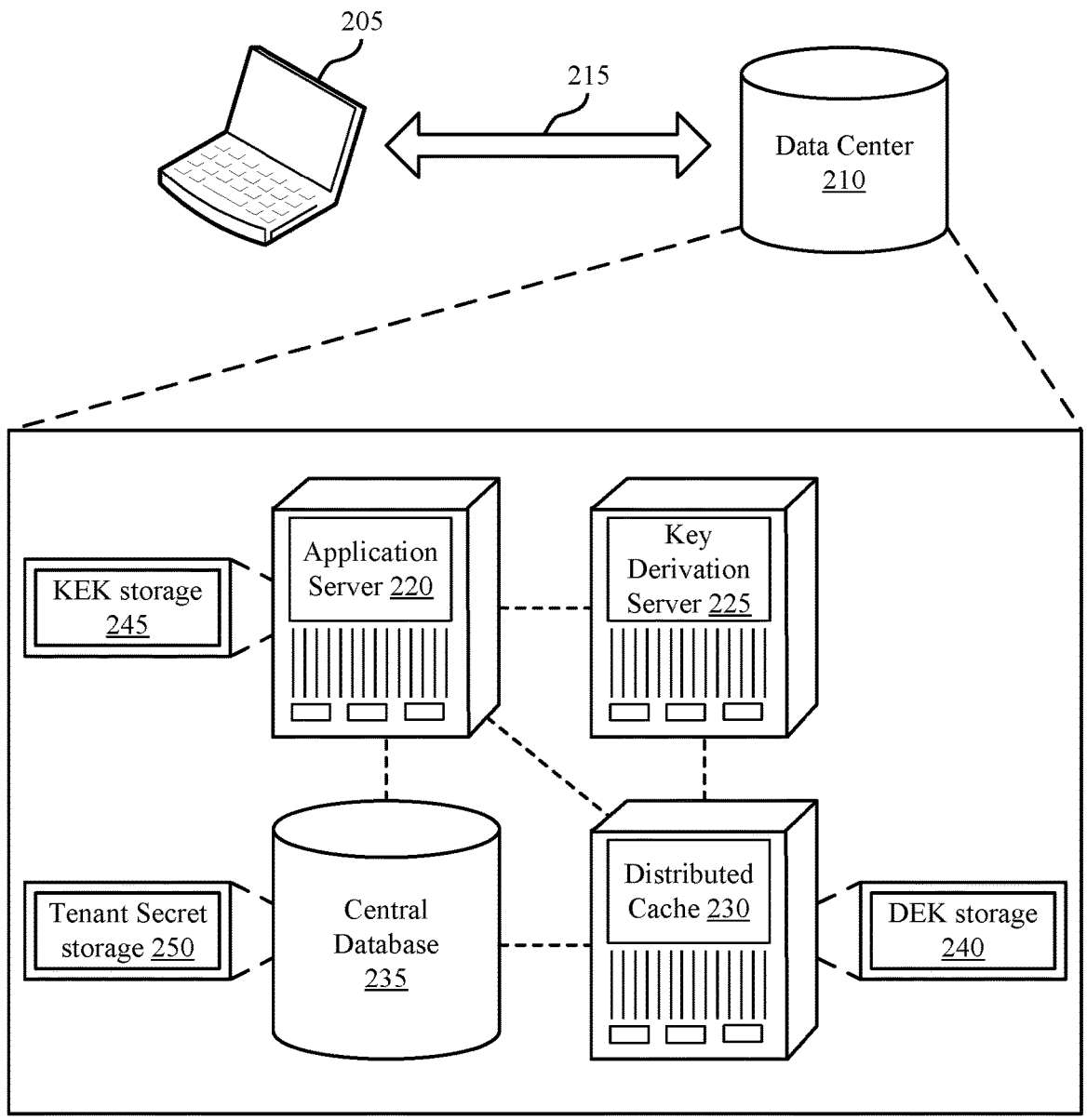
FIG. 2 illustrates an example of a database system that supports distributed key caching for encrypted keys in accordance with aspects of the present disclosure.

FIG. 2 illustrates an example of a database system 200 that supports distributed key caching for encrypted keys in accordance with various aspects of the present disclosure. The database system 200 may include a user device 205 that may interact with a data center 210 (e.g., over communication link 215). The user device 205 may store data records at the data center 210, and may retrieve data records from the data center 210. The user device 205 may also modify encryption at the data center 210, for example, by generating, rotating, or revoking tenant secrets or encryption keys for the data center 210. The data center 210 may include multiple components, including an application server 220, a key derivation server 225, a distributed cache 230, a central database 235, or some combination of these or other data center components. Using these components, the data center 210 may support separation of storage for different encryption parameters, which may increase the security of encrypted data. For example, DEK storage 240, KEK storage 245, and tenant secret storage 250 may be handled by separate components of the data center 210, the separate components physically located at different locations. This may protect against unauthorized users easily accessing all of the information used of encryption.

In some cases, a user or tenant (e.g., a user or tenant operating the user device 205) may have specific security protocols or requirements for data records stored in the data center 210. The data center 210 may handle these security protocols or requirements using secure and efficient encryption processes. In some cases, the data center 210 may handle encryption and encryption parameters (e.g., encryption keys, tenant secrets, etc.) differently on a user-by-user basis. For example, the data center 210 may modify storage and handling of encryption parameters for users with greater security requirements, and may manage this more secure encryption using distributed key caching for encrypted encryption keys. In other cases, the data center 210 may implement distributed key caching for encrypted encryption keys for all tenants or users. The data center 210 may implement key management interoperability protocols (KMIPs) for handling encryption keys and key derivation.

For example, the data center 210 may support tenants or users with lower security standards by storing DEKs locally in application servers 220, which may be referred to as workers or worker servers. Each application server 220 that uses a DEK may make a key derivation request to the key derivation server 225 to retrieve the DEK. In some cases, this may result in scalability issues with the encryption process, as multiple application servers 220 may make key derivation calls for multiple encryption keys (e.g., for different tenants in a multi-tenant system). The application servers 220 may use the DEK for encryption or decryption. For example, the user device 205 may send a request message to the data center 210 indicating data to encrypt or encrypted data to retrieve, and the application server 220 may use the DEK to perform the requested cryptographic processes (e.g., encryption or decryption). Each application server 220 that uses the encryption key may store the encryption key in a local least recently used (LRU) key cache (e.g., a 1024 occupancy LRU cache). However, this persistent storage of the DEKs in multiple application servers 220 may result in security issues, as the application servers 220 may store a DEK in memory well beyond the handling of key retrieval requests, and may not support efficient processes for removing the DEKs from local storage for all application servers 220.

Alternatively, the data center 210 may support distributed key caching for encrypted encryption keys. For example, the data center 210 may implement this method of encryption parameter storage for high security tenants, or may implement this method for all tenants and users that utilize encryption. In some systems, a tenant may select whether to turn encryption on for data records stored by that tenant in the data center 210. The data center may utilize distributed key caching for all tenants that select to implement encryption.

In distributed key caching for encrypted keys, the data center 210 may implement a distributed cache 230 for DEK storage 240. In some cases, the distributed cache 230 may be built on top of a distributed memory object caching system, such as Memcached, and may utilize an application programming interface (API) for cache management. In some cases, the distributed cache 230 may be a component of the central database 235, and may be accessible to all application servers 220 in the data center 210. The application servers 220 may implement a key service to handle retrieving DEKs based on an indicated tenant secret. The distributed cache 230 may store a single copy of an encryption key in DEK storage 240, rather than each application server 220 storing a different copy of the DEK in local storage. This single copy of an encryption key may provide the data center 210 with a single point for derivation and invalidation. That is, the distributed cache 230—and not multiple application servers 220—may derive the encryption key from a key derivation server 225, and may invalidate the encryption key based on a user command or a time-to-live (TTL) parameter of the encryption key. Once invalidated or removed from the distributed cache 230, an encryption key may not be visible to any application servers 220.

The data center 210 may implement additional security measures to protect the encryption keys stored in the distributed cache 230. For example, the data center 210 may protect against an unauthorized user gaining access to encrypted data by retrieving the contents of the distributed cache 230 using a telnet protocol, memory sniffing, or network sniffing as encryption keys are passed from the distributed cache 230 to an application server 220. To protect against such attacks, or other unauthorized attempts to read encrypted data records, the distributed cache 230 may store the encryption keys as ciphertext, rather than plaintext. Additionally, the encryption keys may be transported across the network (e.g., from key derivation server 225 to the distributed cache 230, and from the distributed cache 230 to the application server 220) as ciphertext.

In order to encrypt the DEKs, the data center 210 may utilize one or more KEKs. The KEKs may be tenant-specific, randomly generated, time-based, or some combination of these. However, in some systems, a KEK may never enter the distributed cache 230. Instead, the key derivation server 225 may encrypt the DEK using the KEK, and pass the encrypted DEK to the distributed cache 230. For example, to encrypt the DEK, the key derivation server 225 may utilize a key wrap algorithm to wrap the DEK using the KEK. To obtain the DEK, and application server 220 may receive the encrypted DEK from the distributed cache 230, and may retrieve the KEK from a local cache or from the key derivation server 225 to decrypt—or unwrap—the encrypted DEK. The application server 220 may include KEK storage 245 in a local key cache, but may not store either the DEK or encrypted DEK. Instead, the decrypted plaintext version of the DEK may exist for the duration of an encryption key request in the application server 220, and then may be destroyed. In this way, the encrypted DEKs and the keys to unlock them (i.e., the KEKs) may be stored separately for enhanced security. Additionally or alternatively, the key derivation server 225 may store KEKs for faster derivation, but may not store DEKs or encrypted DEKs. In some cases, the key derivation server 225 may alternatively store encrypted DEKs, but may not store KEKs.

The data center 210 may additionally support BYOK for tenants. BYOK may be an optional feature for a tenant. For example, the data center 210 may generate a tenant secret for a tenant, the tenant may provide a tenant secret, or the tenant may provide an encryption key (e.g., depending on an encryption option selected by the tenant). In the first two options, the key derivation server 225 may utilize one or more embedded hardware security modules (HSMs) for encryption key generation. For example, an embedded HSM may generate the tenant secret, or identify a user provided tenant secret. A key derivation function (e.g., a password-based key derivation function 2 (PBKDF2)) may take the tenant secret as an input, and may generate a tenant-specific encryption key. In some cases, the key derivation function may additionally receive a master secret, a master salt, or both as inputs to determine the tenant-specific encryption key (e.g., a DEK). The key derivation server 225 may additionally generate universal, tenant-specific, or DEK-specific KEKs. The KEKs may be generated based on a same HSM, master secret, master salt, and/or key derivation function, or may be generated based on different parameters and functions than the DEKs.

In the third option described above, a tenant or user may opt out of using an embedded HSM or key derivation function of the key derivation server 225 (e.g., for DEK derivation—KEK derivation may or may not still utilize the key derivation functionality of the key derivation server 225). Instead, the user device 205 may upload an encryption key (e.g., generated using an external cryptographer or key derivation hardware associated with the tenant) to the data center 210. In some cases, communication link 215 may include transport level security (TLS) protocols to protect the uploading of tenant secrets or tenant-specific encryption keys. Uploading the tenant secrets or tenant-specific encryption keys may involve a same signed certificate, generated hash mechanism, or both to secure the upload. This may allow for end-to-end encryption, as the encryption keys may be encrypted whenever passing between separate components in the database system 200 (e.g., other than a final derived DEK being passed back to a user device 205 based on a DEK request message). An API or a user interface for BYOK uploads may support tenant secret uploads, encryption key uploads, or both. In some cases, the data center 210 may store uploaded secrets and encryption keys using a same storage mechanism. For example, the central database 235 may contain tenant secret storage 250, which may include data center 210 generated tenant secrets, user uploaded tenant secrets, user uploaded encryption keys, or a combination of these.

In some cases, the data center 210 may not store tenant secrets or tenant-specific encryption keys for a tenant (e.g., based on one or more security protocols or selected encryption options). Instead, the data center 210 may support no backup, cache-only encryption keys. In these cases, the data center 210 may implement a request-based pull procedure, a push procedure, or a time-based expiry procedure for retrieving these cache-only encryption keys.

For a request-based pull procedure, the data center 210 (e.g., the distributed cache 230 of the data center 210) may transmit an external request message to a user device 205 each time an encryption key corresponding to that user is requested in an application. The user device 205 may return the encryption key or permission to access the encryption key (e.g., based on input from a user authorizing the key retrieval). In some cases, the request-based pull procedure may override security functionality of the data center 210 (e.g., security functionality that prohibits sending callouts during a transaction).

For a push procedure, a user may input encryption keys (e.g., DEKs) into the distributed cache 230 based on a periodic or scheduled basis. A key retrieval may wakeup periodically or aperiodically and request an encryption key for the tenant. For a time-based expiry procedure, the data center 210 (e.g., the distributed cache 230 of the data center 210) may transmit a callout to a user device 205 based on a TTL policy or explicit destruction call from a user. For example, the data center 210 may send a first callout to the user device 205, and may receive an encryption key (e.g., a DEK) in response. In some cases, the encryption key may be associated with a user-specified or standard TTL, which may specify an amount of time or a specific time and date. The data center 210 may destroy the encryption key following the specified amount of time or at the specific time and date. In other cases, the user device 205 may send an explicit key destruction request message to the data center 210, and the data center 210 or distributed cache 230 may destroy the encryption key based on the message. The encryption key may be stored in the distributed cache 230 during its existence in the data center 210, and may not be stored in the central database 235 or backed up in any backup or data recovery systems. Any application server 220 may access the encryption key in the distributed cache 230 before it is destroyed based on the time-based expiry or destruction command. Additionally or alternatively, the encryption key may be encrypted using a KEK while stored in the distributed cache 230 (e.g., the encryption may occur at the key derivation server 225).

The data center 210 may provide the user device 205 with access to key usage event logs. These logs may allow a user to view (e.g., in a displayed user interface) information about how encryption keys are being used in the data center 210. For example, the logs may include information about when DEKs are generated and by what user device or user, when DEKs are encrypted or wrapped, when DEKs are stored, cached, decrypted, unwrapped, accessed, or destroyed, when a tenant secret is stored, accessed, or destroyed, when a tenant secret is exported imported, or unavailable, or any other relevant information associated with tenant-specific secrets or encryption keys.

Figure 3:
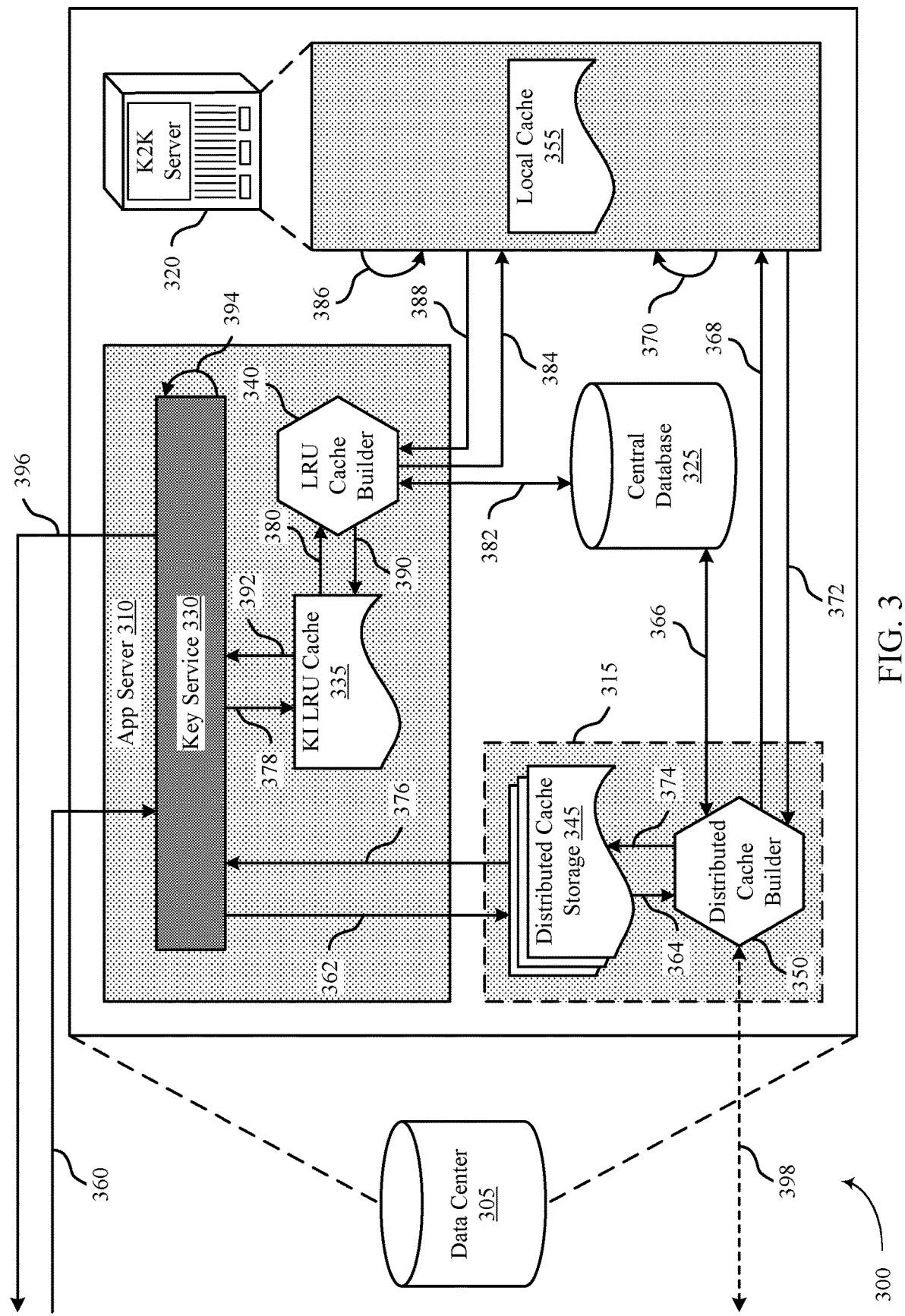
FIG. 3 illustrates an example of a system architecture that supports distributed key caching for encrypted keys in accordance with aspects of the present disclosure.

FIG. 3 illustrates an example of a system architecture 300 that supports distributed key caching for encrypted keys in accordance with various aspects of the present disclosure. The system architecture 300 may include a data center 305, which may be an example of a data center 120 or 210 as described with reference to FIG. 1 or 2. The data center 305 may include an application server 310, a distributed cache 315, a key derivation server 320, a central database 325 (e.g., a centralized file store), or any combination of these components. The application server 310—which may be an example of a single server or a server cluster—may include a key service 330, a KEK LRU cache 335, an LRU cache builder 340, or some combination of these components. Similarly, the distributed cache 315 may include distributed cache storage 345 and/or a distributed cache builder 350, while the key derivation server 320 may include a local cache 355. These many components and sub-components of the data center 305 may interact with each other, as well as with one or more user devices, to handle encryption key requests.

For example, at 360, an application running on a user device, external server, or external file store may send a request message to the data center 305. The request message may include a request for a DEK for encryption or decryption, and may be received by the key service 330 of an application server 310 in the data center 305. In some cases, the request message may include one or more data records to encrypt or decrypt, or may specify one or more data records to retrieve from storage (e.g., a central database 325).

At 362, the key service 330 may send a request message for the DEK to the distributed cache 315. The distributed cache 315 may determine whether the DEK is stored in the distributed cache storage 345. In a "warm" distributed cache scenario, the distributed cache storage 345 may contain the DEK (e.g., encrypted or wrapped using a KEK). In the "warm" distributed cache scenario, the distributed cache 315 may return the DEK to the key service 330 in response to the request message (e.g., at 376). Alternatively, in a "cold" distributed cache scenario, the distributed cache storage 345 may not contain the DEK. In the "cold" distributed cache scenario, the distributed cache storage 345 may send an indication to load the DEK to the distributed cache builder 350 at 364.

At 366, the distributed cache 315 may load a tenant secret associated with the DEK from the central database 325. For example, the distributed cache builder 350 may transmit a tenant secret request message to the central database 325, and the central database 325 may identify a corresponding stored tenant secret. In some cases, the central database 325 may identify a single tenant secret for both a DEK and KEK, while in other cases, the central database 335 may identify a separate DEK tenant secret and KEK tenant secret. The central database 325 may send the identified tenant secret to the distributed cache builder 350 in response to the tenant secret request message.

At 368, the distributed cache 315 (e.g., the distributed cache builder 350) may transmit a DEK request message, including the tenant secret, to the key derivation server 320. In some cases, the distributed cache 315 may send a tenant secret for the DEK and KEK using transport level security (TLS). The key derivation server 320—which, in some cases, may be referred to as a key-to-key (K2K) server—may derive the DEK and a KEK based on the tenant secret. For example, the key derivation server 320 may derive the DEK based on a DEK tenant secret and the KEK based on a KEK tenant secret, or may derive both the DEK and the KEK based on a single tenant secret. At 370, the key derivation server 320 may encrypt or wrap the DEK using the KEK. In some cases, the key derivation server 320 may store the KEK in the local cache 355. However, in some cases, the key derivation server 320 may not store the DEK or wrapped DEK in the local cache 355 in order to store the DEK and KEK separately. This separation of key storage may be based on security parameters of the system architecture 300. At 372, the key derivation server 320 may send the wrapped DEK (e.g., using TLS) to the distributed cache 315 in response to the DEK request message.

At 374, the distributed cache builder 350 may send the wrapped DEK to distributed cache storage 345, where the wrapped DEK may be stored. Once in distributed cache storage 345, the wrapped DEK may be used for warm cache calls. The distributed cache 315 may not receive any KEKs, thereby implementing separation of key storage. At 376, the distributed cache builder 350 may return the wrapped DEK to the key service 330 in response to the request message.

At 378, the key service 330 may send a retrieval request for the KEK to a local key cache 335 of the application server 310. The local key cache 335 may be an example of key infrastructure (KI) least-recently-used (LRU) cache. For example, the local key cache 335 may store multiple KEKs. In a "warm" local cache scenario, the local key cache 335 may contain the KEK indicated in the retrieval request. In such a "warm" local cache scenario, the local key cache 335 may return the KEK to the key service 330 at 392 in response to the retrieval request. Alternatively, in a "cold" local cache scenario, the local key cache 335 may not contain the requested KEK. For example, the local key cache 335 may have not yet stored the KEK, or may have removed the KEK from storage based on an LRU process. In either case, the local key cache 335 may determine to derive the KEK at the key derivation server 320.

At 380, in the "cold" local cache scenario, the local key cache 335 may send a KEK derivation request to the LRU cache builder 340 based on identifying that the local key cache 335 does not contain the KEK. The LRU cache builder 340 may load the corresponding KEK tenant secret from the central database 325 at 382. For example, the LRU cache builder 340 may identify a tenant associated with the KEK, and may transmit an indication of the tenant (e.g., a tenant identifier) to the central database 325. The central database 325 may search for a tenant secret corresponding to the indicated tenant, and may transmit the tenant secret back to the LRU cache builder 340 in response to the tenant identifier.

At 384, the LRU cache builder 340 may transmit the KEK tenant secret to the key derivation server 320 in a KEK derivation request. The key derivation server 320 may check the local cache 355 for the KEK corresponding to the received KEK tenant secret. If the key derivation server 320 identifies the corresponding KEK in the local cache 355, the key derivation server may return the KEK to the LRU cache builder 340 at 388. Alternatively, if the key derivation server 320 does not identify the corresponding KEK in the local cache 355, the key derivation server 320 may derive the KEK at 386 based on the KEK tenant secret. The key derivation server 320 may then store the derived KEK at the local cache 355, and may return the derived KEK to the LRU cache builder 340 at 388.

At 390, the LRU cache builder 340 may cache the retrieved KEK in the application server 310 local key cache 335. In the local key cache 335, the KEK may be used for "warm" local cache retrievals. Additionally, each time the KEK is retrieved from the local key cache 335, the local key cache 335 may mark the KEK with an indication of a timestamp or may move the KEK in an LRU queue. In this way, a KEK recently retrieved from the local key cache 335 may not be removed from the local key cache 335 by an LRU algorithm. Just as in the "warm" local cache scenario, once the KEK is derived and stored at the local key cache, the local key cache 335 may send the KEK to the key service 330 at 392 in response to the KEK retrieval request. In some cases, retrieving the wrapped DEK from the distributed cache 315 and the KEK from the local key cache 335 may occur synchronously. In other cases, these process may be asynchronous.

At 394, the key service 330 may decrypt the encrypted DEK using the retrieved KEK. For example, the DEK may be wrapped by the KEK using a wrapping algorithm. The key service 330 may implement an unwrapping algorithm using the KEK to determine the unencrypted DEK. The application server 310 may not store the unencrypted DEK, for example, to maintain security protocols. Instead, the application server 310 may perform an encryption or decryption process using the unencrypted DEK, for example, on data received from the user device or from a database, such as the central database 325. At 396, the key service 330 or the application server 310 may return a response message to the user device (e.g., including decrypted data requested by the user device, or an indication that data was encrypted using the DEK). In some cases, the key service 330 may send the DEK to a different application server, or to an application running on the user device in response to the initial request message.

In some cases, a tenant may not store a tenant secret in the central database 325. For example, due to external tenant security protocols, the tenant may not allow tenant secrets to be stored anywhere in the system architecture 300. Additionally or alternatively, the tenant may not allow a tenant secret to be generated by a component of the data center 305. In these cases, a user or user device associated with a tenant may upload a tenant secret or encryption key to the distributed cache 315 at 398. For example, the tenant may upload the tenant secret at 398 via a Setup interface or an application programming interface (API). The upload process may implement a signed certificate, a generated hash mechanism, or both to securely upload the tenant secret or encryption key.

In some cases, a tenant may opt out of using a hardware security module (HSM) of the key derivation server 320. The HSM may generate an encryption key based on a secret (e.g., a tenant secret) and other possible parameters. For example, a tenant may opt out of the HSM if the tenant uses external cryptographic applications or key derivation hardware. In such cases, the tenant may upload a tenant-specific encryption key, rather than a tenant secret, at 398, and the system architecture 300 may handle the tenant-specific encryption key as a DEK. The data center 305 may use a same storage mechanism for storing tenant-uploaded secrets and encryption keys. The data center 305 may implement an augmented Setup interface or API to support tenant-specific encryption key uploads, in addition to tenant secret uploads.

Figure 4:
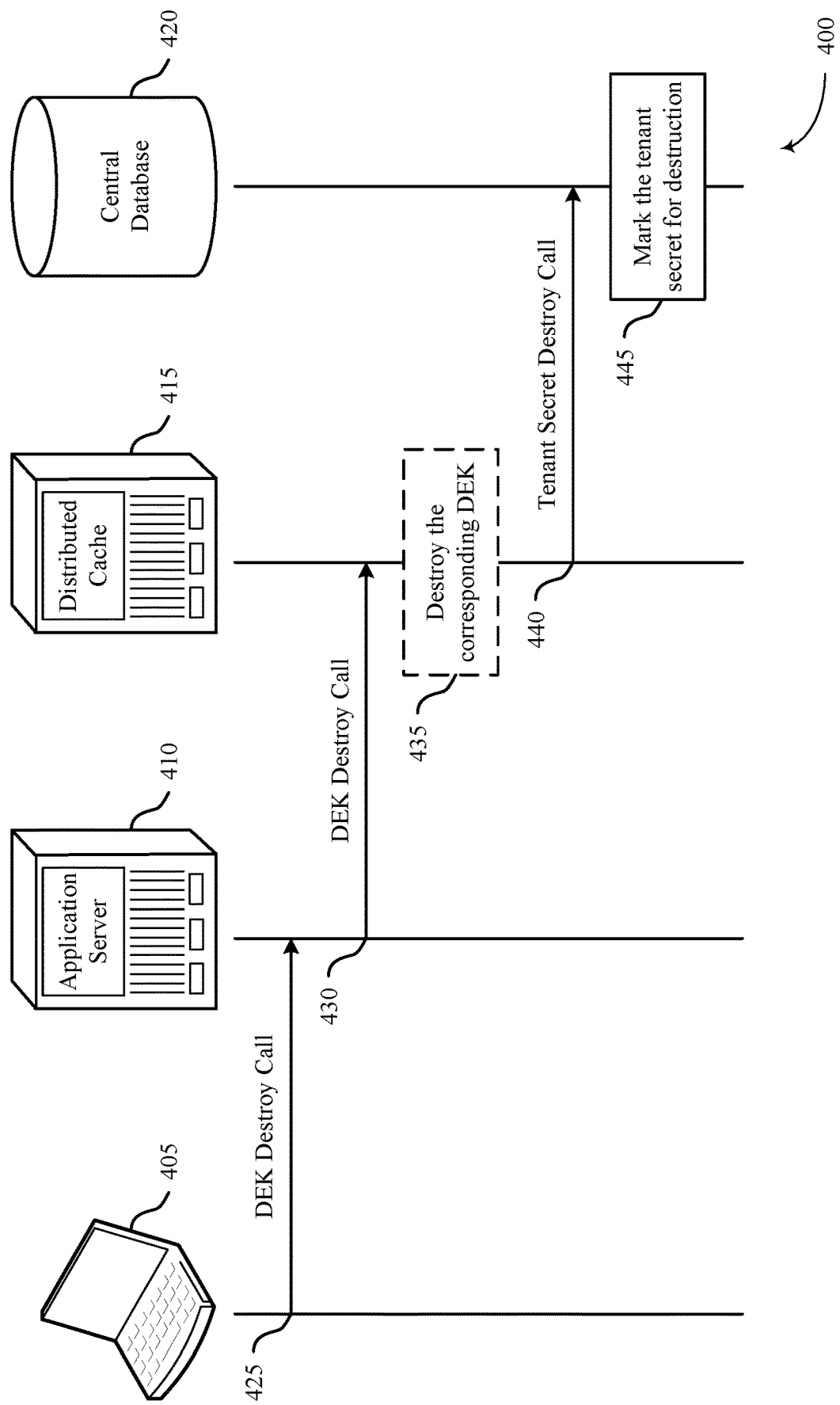
FIG. 4 illustrates an example of a process flow for key deletion that supports distributed key caching for encrypted keys in accordance with aspects of the present disclosure.

FIG. 4 illustrates an example of a process flow 400 for key deletion that supports distributed key caching for encrypted keys in accordance with various aspects of the present disclosure. The process flow 400 for key deletion may include a user device 405, an application server 410, a distributed cache 415, a central database 420, or any other components of a data center. These components may be examples of the corresponding components described with reference to FIGS. 2 and 3. The process flow 400 may illustrate a process for deleting encryption keys and secrets for a specified tenant.

At 425, the user device 405 may send a call to a key service of the application server 410. The call may be an example of a destroy call, and may indicate either an encryption key (e.g., a DEK), a tenant, a tenant secret, or some combination of these. For example, the destroy call may specify a tenant secret, and the user device may send the destroy call to remove the tenant secret and any encryption keys associated with the tenant secret from a data center (e.g., the data center containing the application server 410, the distributed cache 415, and the central database 420).

At 430, the application server 410 may send an encryption key destroy call to the distributed cache 415. The encryption key destroy call may include an indication of the tenant or tenant secret. In some cases, at 435, the distributed cache 415 may search distributed cache storage for any encryption keys (e.g., DEKs) corresponding to the indicated tenant or tenant secret, and may remove the corresponding encryption keys from the distributed cache 415. In other cases, the distributed cache 415 may not destroy the corresponding encryption keys, and instead may implement key destruction markers. For example, when retrieving an encryption key, the distributed cache 415 may first determine whether the corresponding tenant secret is marked with a key destruction marker. If the tenant secret contains the key destruction marker, the distributed cache 415 may refrain from retrieving any encryption keys associated with that tenant secret, effectively destroying those encryption keys from a user access standpoint.

At 440, the distributed cache 415 may transmit a tenant secret destroy call to the central database 420. The tenant secret destroy call may indicate a tenant or a specific tenant secret. At 445, the central database 420 may mark the indicated tenant secret (e.g., either explicitly indicated, or an active tenant secret for an indicated tenant) for destruction. In some cases, the central database 420 may remove the tenant secret from the central database 420. In other cases, the central database 420 may mark the tenant secret with a key destruction marker, to block user access to any existing encryption keys associated with the tenant secret.

Figure 5:
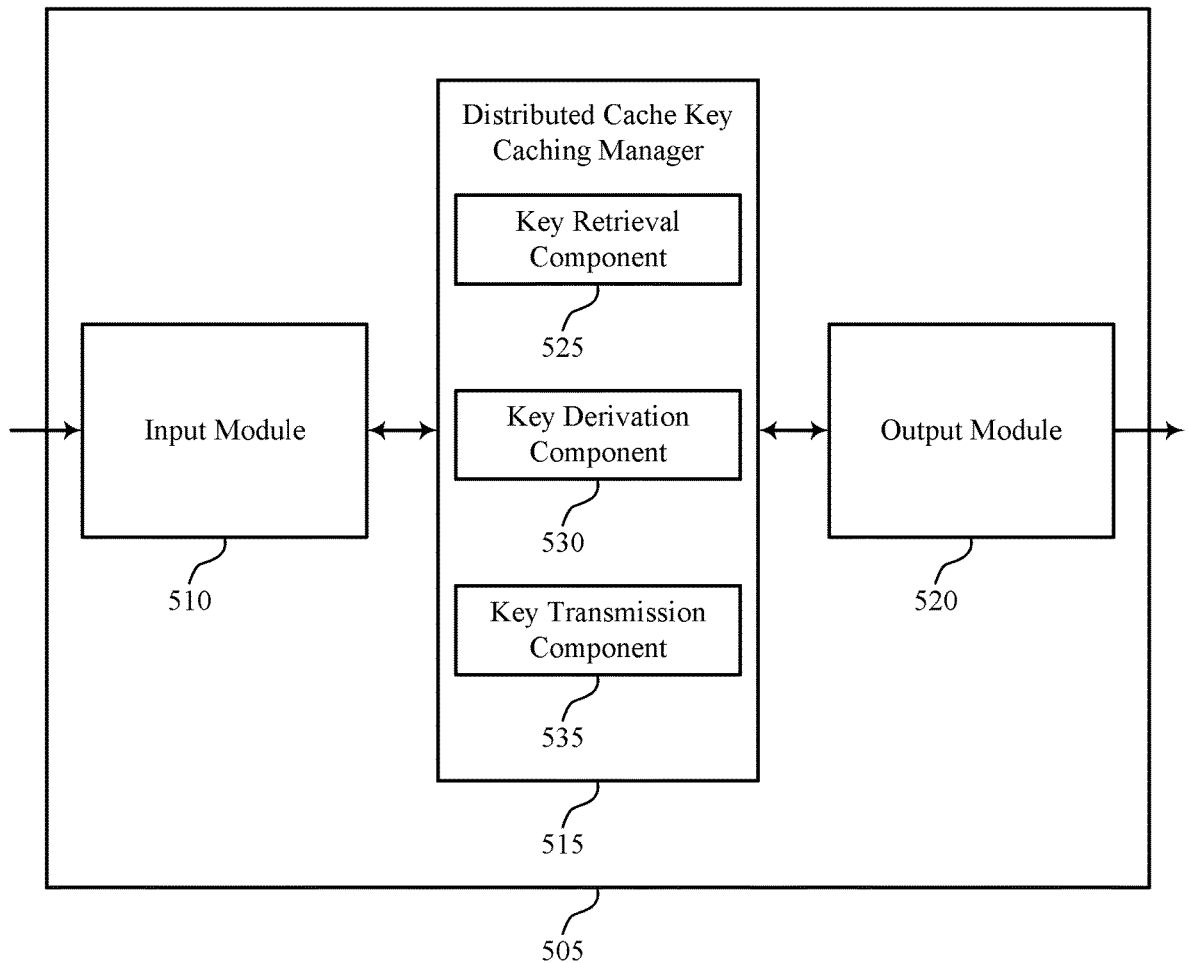
FIGS. 5 and 6 show block diagrams of a device that supports distributed key caching for encrypted keys in accordance with aspects of the present disclosure.

FIG. 5 shows a block diagram 500 of an apparatus 505 that supports distributed key caching for encrypted keys in accordance with aspects of the present disclosure. Apparatus 505 may include input module 510, distributed cache key caching manager 515, and output module 520. Apparatus 505 may also include a processor. Each of these components may be in communication with one another (e.g., via one or more buses). In some cases, apparatus 505 may be an example of a user terminal, a database server, or a system containing multiple computing devices.

Distributed cache key caching manager 515 may be an example of aspects of the distributed cache key caching manager 715 described with reference to FIG. 7. Distributed cache key caching manager 515 may also include key retrieval component 525, key derivation component 530, and key transmission component 535.

Distributed cache key caching manager 515 and/or at least some of its various sub-components may be implemented in hardware, software executed by a processor, firmware, or any combination thereof. If implemented in software executed by a processor, the functions of the distributed cache key caching manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The distributed cache key caching manager 515 and/or at least some of its various sub-components may be physically located at various positions, including being distributed such that portions of functions are implemented at different physical locations by one or more physical devices. In some examples, distributed cache key caching manager 515 and/or at least some of its various sub-components may be a separate and distinct component in accordance with various aspects of the present disclosure. In other examples, distributed cache key caching manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Key retrieval component 525 may receive, at a distributed cache, a first encryption key parameter associated with a tenant and receive a second encryption key parameter associated with the first encryption key parameter. In some cases, the receiving the first encryption key parameter includes receiving the first encryption key parameter from a database. In some cases, the receiving the first encryption key parameter includes receiving, from a user, the first encryption key parameter as a user input.

Key derivation component 530 may transmit, to a key derivation server, the first encryption key parameter and the second encryption key parameter and receive, from the key derivation server, an encrypted encryption key associated with the first encryption key parameter and encrypted using an encryption key associated with the second encryption key parameter. In some cases, the encrypted encryption key is encrypted using a key wrap algorithm. Key transmission component 535 may transmit, to an application server, the encrypted encryption key.

Figure 6:
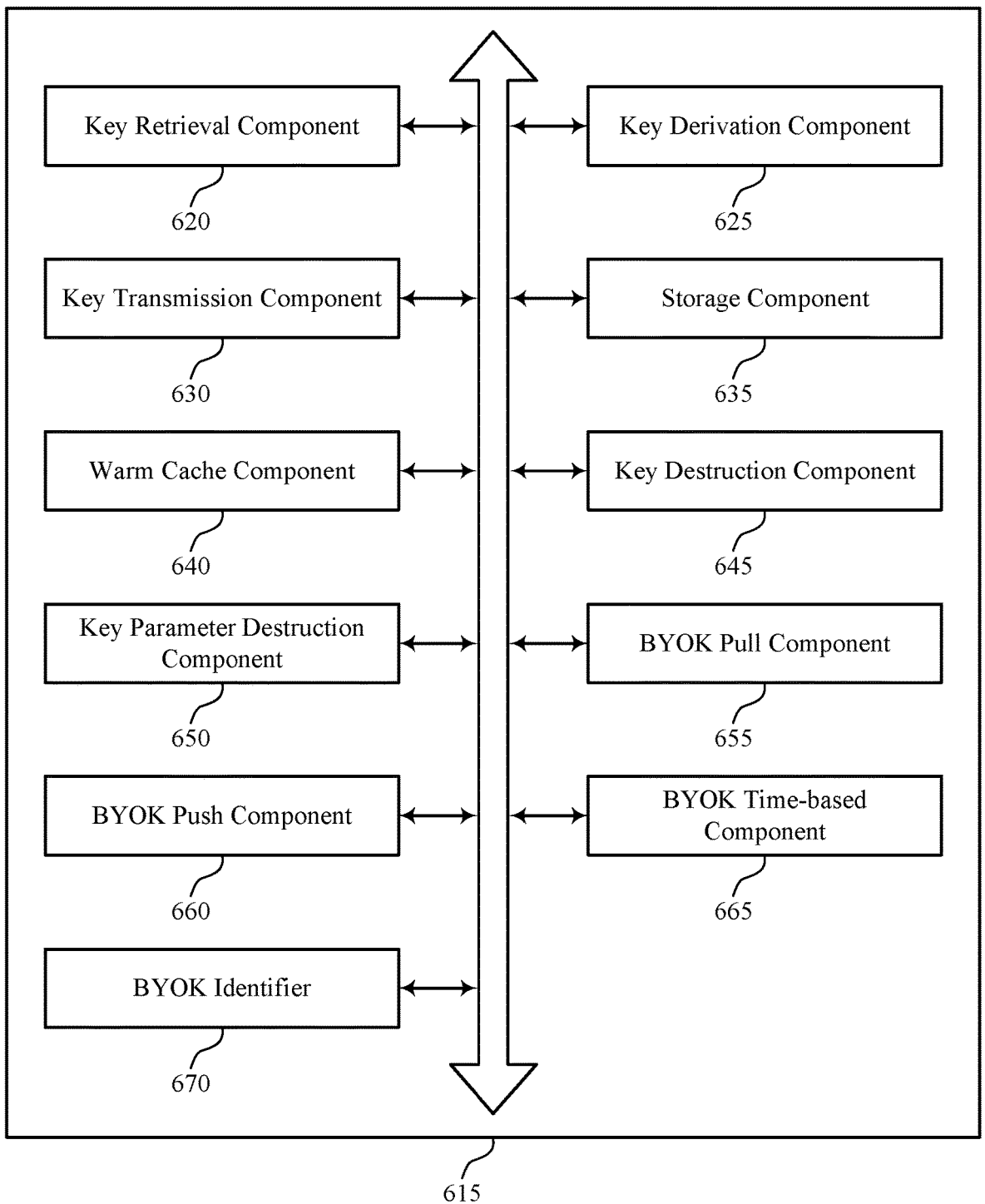

FIG. 6 shows a block diagram 600 of a distributed cache key caching manager 615 that supports distributed key caching for encrypted keys in accordance with aspects of the present disclosure. The distributed cache key caching manager 615 may be an example of aspects of a distributed cache key caching manager 515 or 715 described with reference to FIGS. 5 and 7. The distributed cache key caching manager 615 may include key retrieval component 620, key derivation component 625, key transmission component 630, storage component 635, warm cache component 640, key destruction component 645, key parameter destruction component 650, BYOK pull component 655, BYOK push component 660, BYOK time-based component 665, and BYOK identifier 670. Each of these modules may communicate, directly or indirectly, with one another (e.g., via one or more buses).

Key retrieval component 620 may receive, at a distributed cache, a first encryption key parameter associated with a tenant and receive a second encryption key parameter associated with the first encryption key parameter. In some cases, receiving the first encryption key parameter includes receiving the first encryption key parameter from a database. In other cases, receiving the first encryption key parameter includes receiving, from a user, the first encryption key parameter as a user input.

Key derivation component 625 may transmit, to a key derivation server, the first encryption key parameter and the second encryption key parameter and may receive, from the key derivation server, an encrypted encryption key associated with the first encryption key parameter and encrypted using an encryption key associated with the second encryption key parameter. In some cases, the encrypted encryption key is encrypted using a key wrap algorithm. Key transmission component 630 may transmit, to an application server, the encrypted encryption key.

Storage component 635 may store, at the distributed cache, the encrypted encryption key. Warm cache component 640 may receive, from the application server, a request message for the encrypted encryption key and transmit, to the application server, the encrypted encryption key based on storing the encrypted encryption key at the distributed cache.

Key destruction component 645 may receive, from the application server, a destruction request message to destroy the first encryption key parameter. Key destruction component 645 may further determine that the encrypted encryption key associated with the first encryption key parameter is stored at the distributed cache, and remove the encrypted encryption key from the distributed cache based on the destruction request message.

Key parameter destruction component 650 may receive, from the application server, a first destruction request message to destroy the first encryption key parameter and may send, to the database, a second destruction request message to remove the first encryption key parameter from the database.

BYOK pull component 655 may receive, from the application server, a request message associated with the first encryption key parameter and send, to the user, a call out message requesting the first encryption key parameter based on the request message, where receiving, from the user, the first encryption key parameter is based on the call out message. BYOK push component 660 may receive the first encryption key parameter from the user based on an upload periodicity or an upload schedule. BYOK time-based component 665 may send, to the user, a first call out message requesting the first encryption key parameter, where receiving, from the user, the first encryption key parameter is based on the first call out message. Additionally, BYOK time-based component 665 may send, to the user, a second call out message requesting an updated encryption key parameter based on a time-to-live parameter or a destruction request message received from the user. BYOK identifier 670 may determine whether the first encryption key parameter includes a tenant-specific encryption key or a tenant secret based on metadata associated with the user input.

Figure 7:
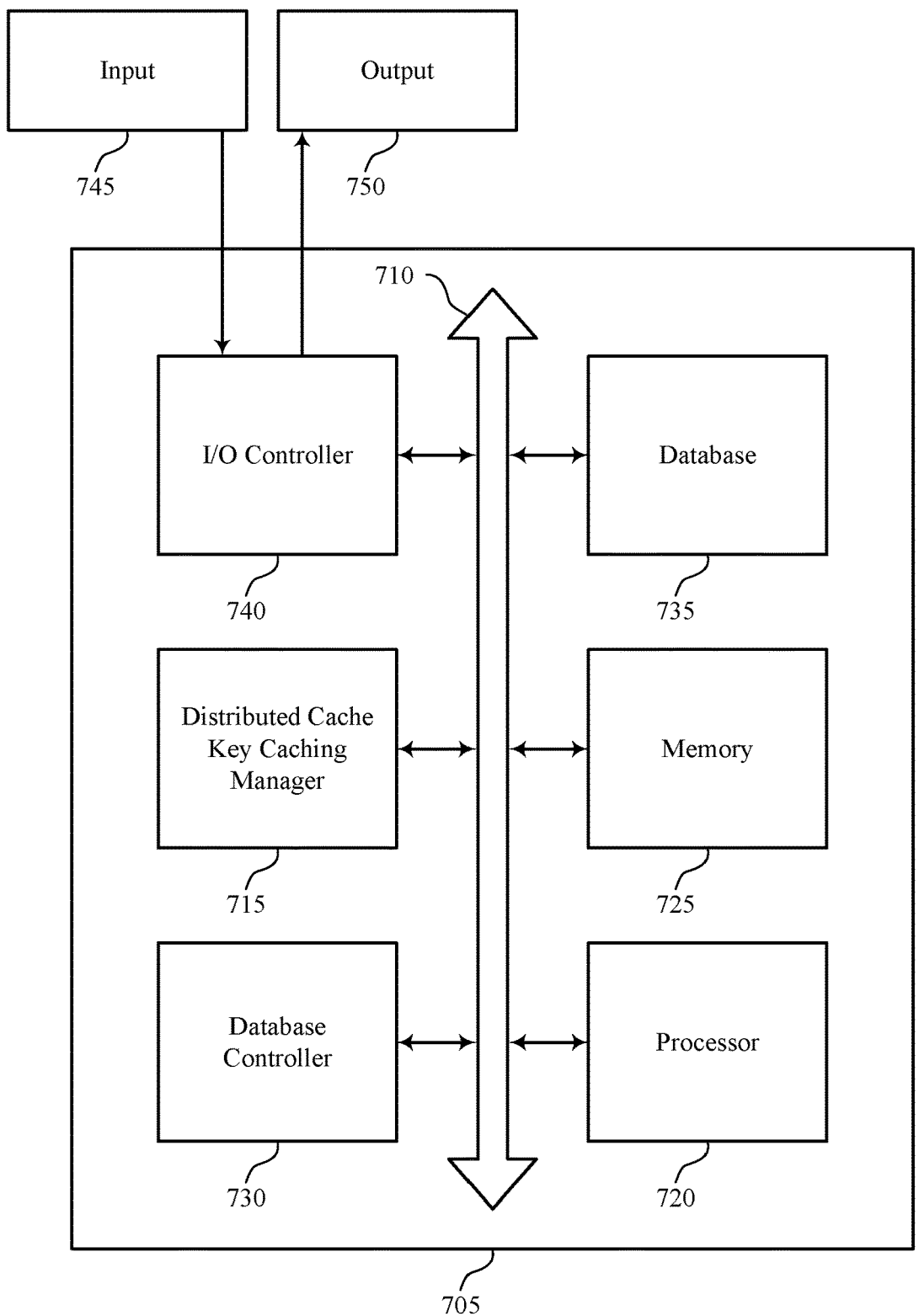
FIG. 7 illustrates a block diagram of a system including a distributed cache that supports distributed key caching for encrypted keys in accordance with aspects of the present disclosure.

FIG. 7 shows a diagram of a system 700 including a device 705 that supports distributed key caching for encrypted keys in accordance with aspects of the present disclosure. Device 705 may be an example of or include the components of distributed cache as described above, e.g., with reference to FIGS. 2 through 4. Device 705 may include components for bi-directional data communications including components for transmitting and receiving communications, including distributed cache key caching manager 715, processor 720, memory 725, database controller 730, database 735, and I/O controller 740. These components may be in electronic communication via one or more buses (e.g., bus 710).

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting distributed key caching for encrypted keys).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Database controller 730 may manage data storage and processing in database 735. In some cases, a user may interact with database controller 730. In other cases, database controller 730 may operate automatically without user interaction. Database 735 may be an example of a single database, a distributed database, multiple distributed databases, or an emergency backup database.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

Figure 8:
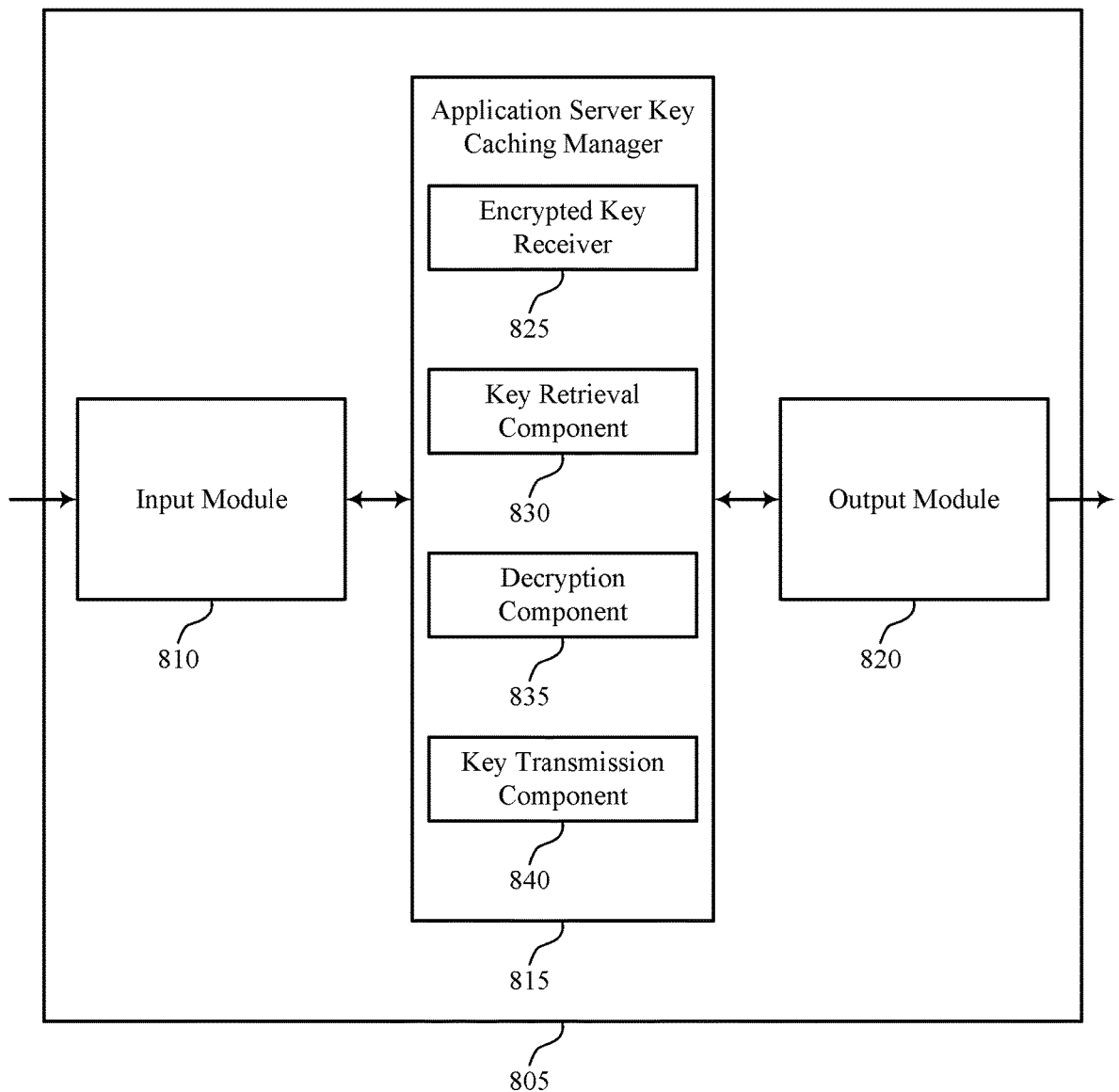
FIGS. 8 and 9 show block diagrams of a device that supports distributed key caching for encrypted keys in accordance with aspects of the present disclosure.

FIG. 8 shows a block diagram 800 of an apparatus 805 that supports distributed key caching for encrypted keys in accordance with aspects of the present disclosure. Apparatus 805 may include input module 810, application server key caching manager 815, and output module 820. Apparatus 805 may also include a processor. Each of these components may be in communication with one another (e.g., via one or more buses). In some cases, apparatus 805 may be an example of a user terminal, a database server, or a system containing multiple computing devices.

Application server key caching manager 815 may be an example of aspects of the application server key caching manager 1015 described with reference to FIG. 10. Application server key caching manager 815 may also include encrypted key receiver 825, key retrieval component 830, decryption component 835, and key transmission component 840.

Application server key caching manager 815 and/or at least some of its various sub-components may be implemented in hardware, software executed by a processor, firmware, or any combination thereof. If implemented in software executed by a processor, the functions of the application server key caching manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The application server key caching manager 815 and/or at least some of its various sub-components may be physically located at various positions, including being distributed such that portions of functions are implemented at different physical locations by one or more physical devices. In some examples, application server key caching manager 815 and/or at least some of its various sub-components may be a separate and distinct component in accordance with various aspects of the present disclosure. In other examples, application server key caching manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Encrypted key receiver 825 may receive, from a distributed cache, an encrypted encryption key, where the encrypted encryption key includes a first encryption key encrypted using a second encryption key. In some cases, the first encryption key is an example of a DEK. In some cases, the second encryption key is an example of a KEK.

Key retrieval component 830 may retrieve the second encryption key from a local cache of an application server. Decryption component 835 may decrypt the encrypted encryption key using the second encryption key to obtain the first encryption key. Key transmission component 840 may transmit the first encryption key.

Figure 9:
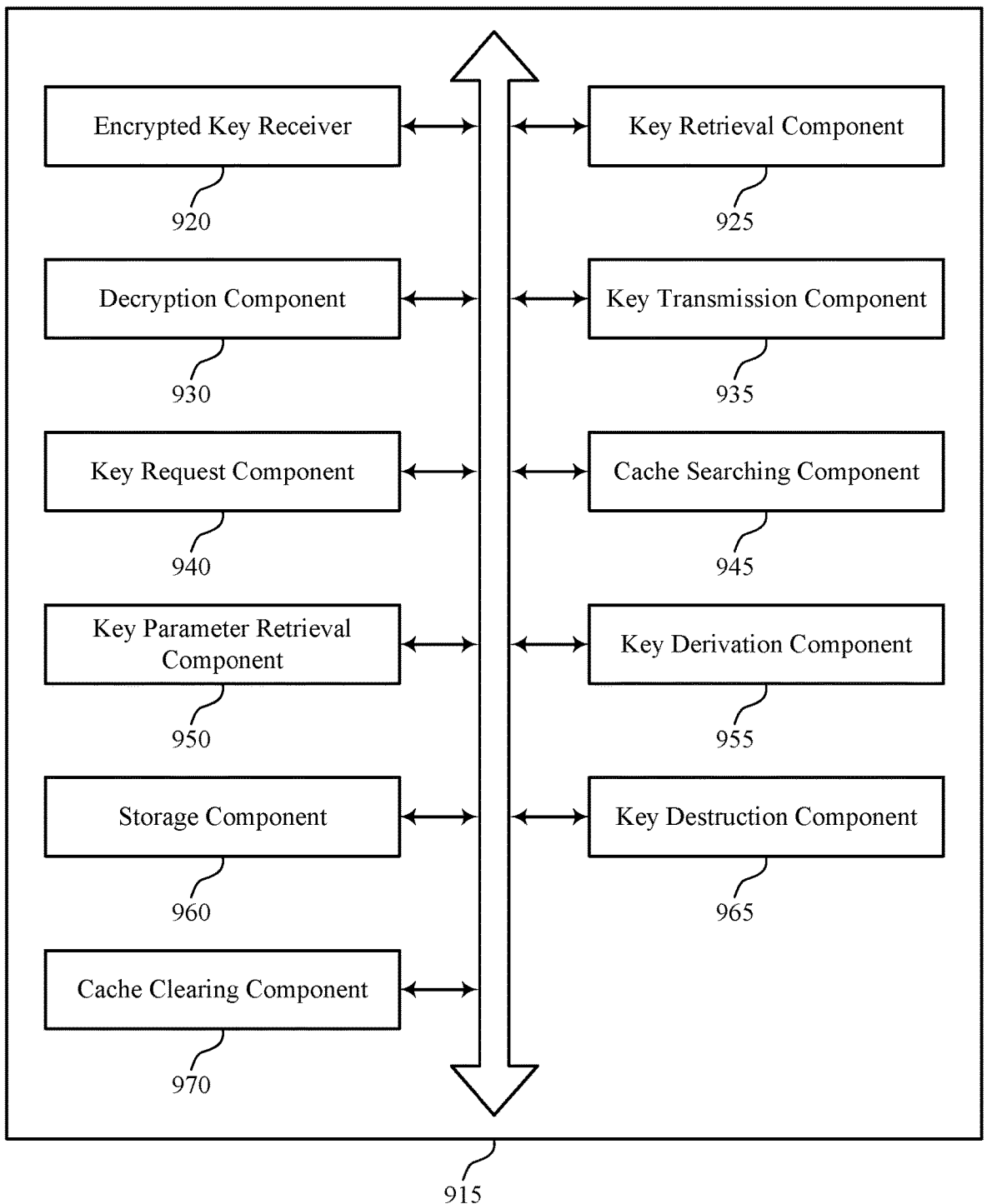

FIG. 9 shows a block diagram 900 of an application server key caching manager 915 that supports distributed key caching for encrypted keys in accordance with aspects of the present disclosure. The application server key caching manager 915 may be an example of aspects of an application server key caching manager 815 or 1015 described with reference to FIGS. 8 and 10. The application server key caching manager 915 may include encrypted key receiver 920, key retrieval component 925, decryption component 930, key transmission component 935, key request component 940, cache searching component 945, key parameter retrieval component 950, key derivation component 955, storage component 960, key destruction component 965, and cache clearing component 970. Each of these modules may communicate, directly or indirectly, with one another (e.g., via one or more buses).

Encrypted key receiver 920 may receive, from a distributed cache, an encrypted encryption key, where the encrypted encryption key includes a first encryption key encrypted using a second encryption key. In some cases, the first encryption key is an example of a DEK. In some cases, the second encryption key is an example of a KEK.

Key retrieval component 925 may retrieve the second encryption key from a local cache of an application server. Decryption component 930 may decrypt the encrypted encryption key using the second encryption key to obtain the first encryption key. Key transmission component 935 may transmit the first encryption key.

Key request component 940 may receive a first request message for the first encryption key and transmit, to the distributed cache, a second request message for the first encryption key.

Cache searching component 945 may determine that the second encryption key is not stored in the local cache of the application server. Key parameter retrieval component 950 may retrieve, from a database, a second encryption key parameter for the second encryption key. Key derivation component 955 may transmit, to a key derivation server, the second encryption key parameter and may receive, in return from the key derivation server, the second encryption key. Storage component 960 may store the second encryption key in the local cache of the application server, where retrieving the second encryption key is based on the storing.

Key destruction component 965 may receive a first destruction request message for the first encryption key and may send, to the distributed cache, a second destruction request message for the first encryption key based on the first destruction request message.

Cache clearing component 970 may remove the second encryption key from the local cache based on an LRU algorithm.

Figure 10:
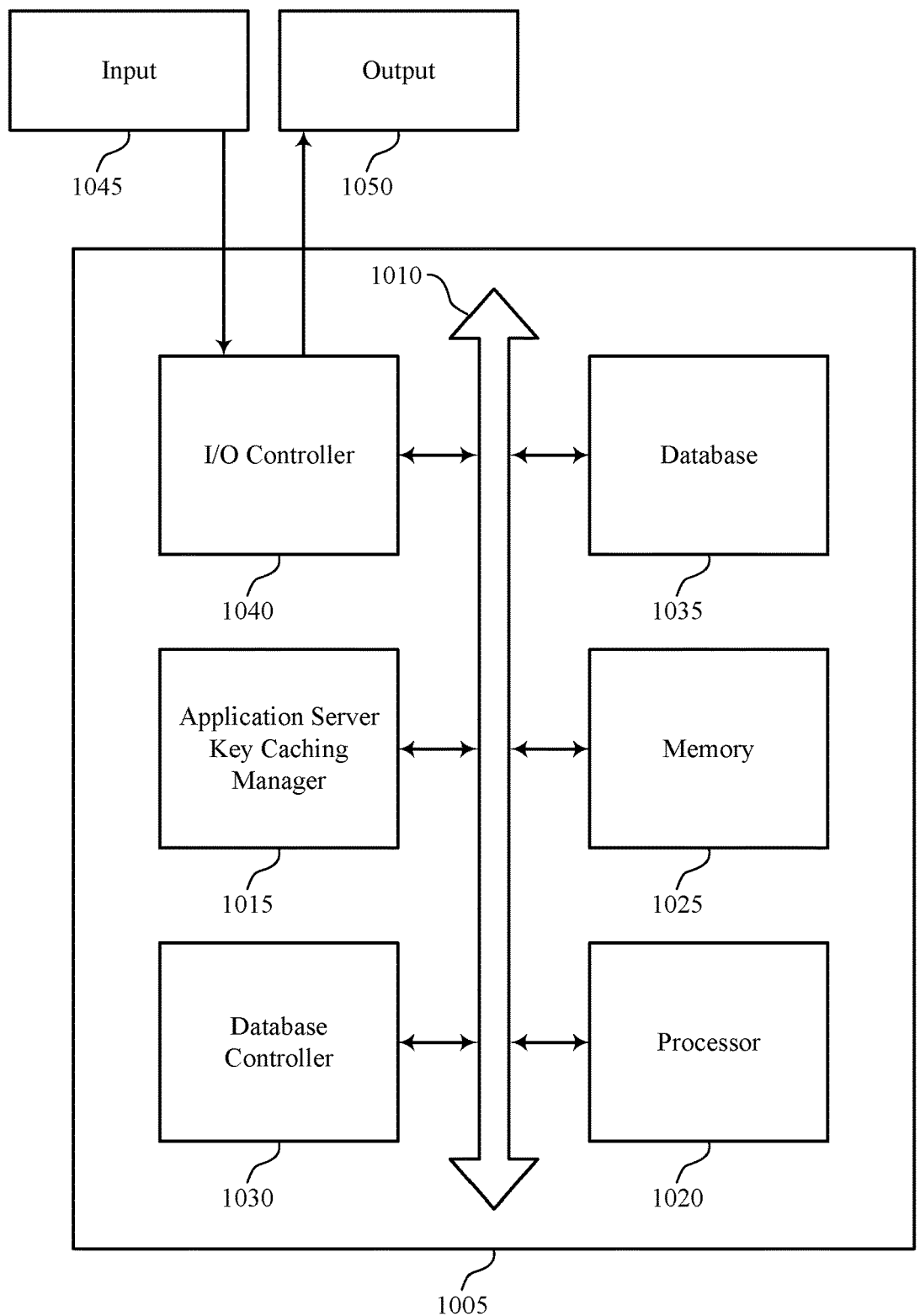
FIG. 10 illustrates a block diagram of a system including an application server that supports distributed key caching for encrypted keys in accordance with aspects of the present disclosure.

FIG. 10 shows a diagram of a system 1000 including a device 1005 that supports distributed key caching for encrypted keys in accordance with aspects of the present disclosure. Device 1005 may be an example of or include the components of application server as described above, e.g., with reference to FIGS. 2 through 4. Device 1005 may include components for bi-directional data communications including components for transmitting and receiving communications, including application server key caching manager 1015, processor 1020, memory 1025, database controller 1030, database 1035, and I/O controller 1040. These components may be in electronic communication via one or more buses (e.g., bus 1010).

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting distributed key caching for encrypted keys).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Database controller 1030 may manage data storage and processing in database 1035. In some cases, a user may interact with database controller 1030. In other cases, database controller 1030 may operate automatically without user interaction. Database 1035 may be an example of a single database, a distributed database, multiple distributed databases, or an emergency backup database.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system. In other cases, I/O controller 1040 may represent or interact with a modem, a keyboard, a mouse, a touchscreen, or a similar device. In some cases, I/O controller 1040 may be implemented as part of a processor. In some cases, a user may interact with device 1005 via I/O controller 1040 or via hardware components controlled by I/O controller 1040.

Figure 11:
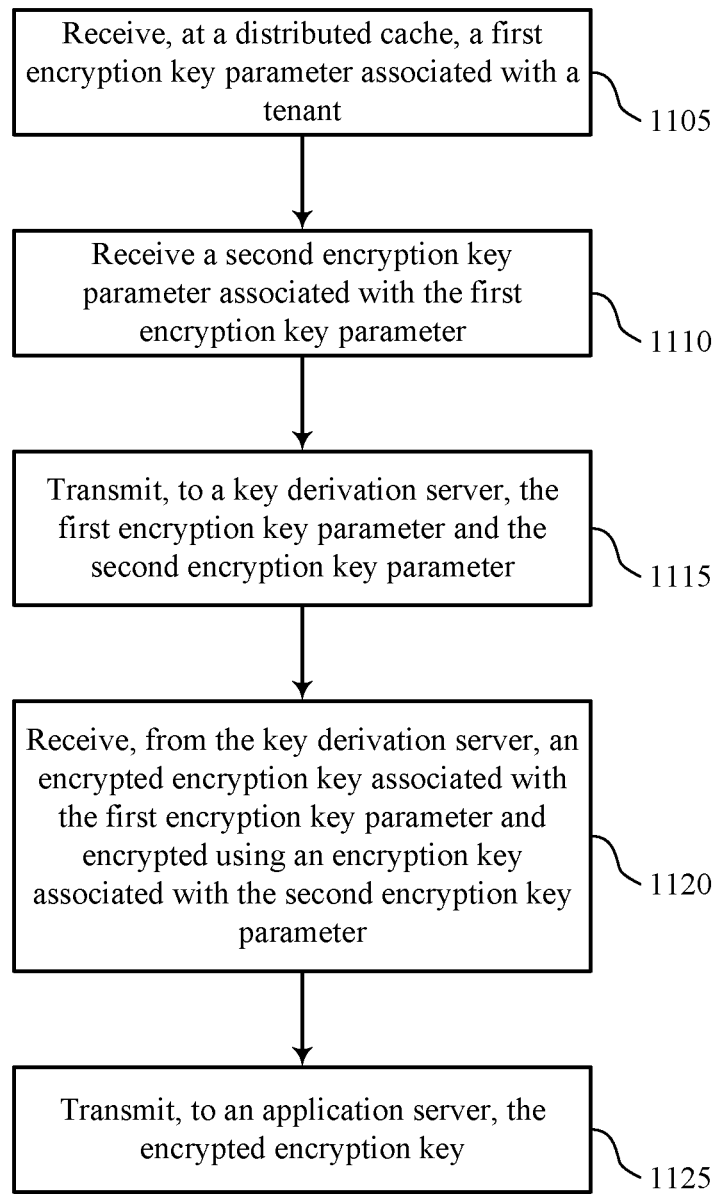
FIGS. 11 through 16 illustrate methods for distributed key caching for encrypted keys in accordance with aspects of the present disclosure.

FIG. 11 shows a flowchart illustrating a method 1100 for distributed key caching for encrypted keys in accordance with aspects of the present disclosure. The operations of method 1100 may be implemented by a distributed cache (e.g., a distributed cache 230, 315, or 415) or its components as described herein. For example, the operations of method 1100 may be performed by a distributed cache key caching manager as described with reference to FIGS. 5 through 7. In some examples, a distributed cache may execute a set of codes to control the functional elements of the device to perform the functions described below. Additionally or alternatively, the distributed cache may perform aspects of the functions described below using special-purpose hardware.

At block 1105 the distributed cache may receive, at a distributed cache, a first encryption key parameter associated with a tenant. The operations of block 1105 may be performed according to the methods described herein. In certain examples, aspects of the operations of block 1105 may be performed by a key retrieval component as described with reference to FIGS. 5 through 7.

At block 1110 the distributed cache may receive a second encryption key parameter associated with the first encryption key parameter. The operations of block 1110 may be performed according to the methods described herein. In certain examples, aspects of the operations of block 1110 may be performed by a key retrieval component as described with reference to FIGS. 5 through 7.

At block 1115 the distributed cache may transmit, to a key derivation server, the first encryption key parameter and the second encryption key parameter. The operations of block 1115 may be performed according to the methods described herein. In certain examples, aspects of the operations of block 1115 may be performed by a key derivation component as described with reference to FIGS. 5 through 7.

At block 1120 the distributed cache may receive, from the key derivation server, an encrypted encryption key associated with the first encryption key parameter and encrypted using an encryption key associated with the second encryption key parameter. The operations of block 1120 may be performed according to the methods described herein. In certain examples, aspects of the operations of block 1120 may be performed by a key derivation component as described with reference to FIGS. 5 through 7.

At block 1125 the distributed cache may transmit, to an application server, the encrypted encryption key. The operations of block 1125 may be performed according to the methods described herein. In certain examples, aspects of the operations of block 1125 may be performed by a key transmission component as described with reference to FIGS. 5 through 7.

Figure 12:
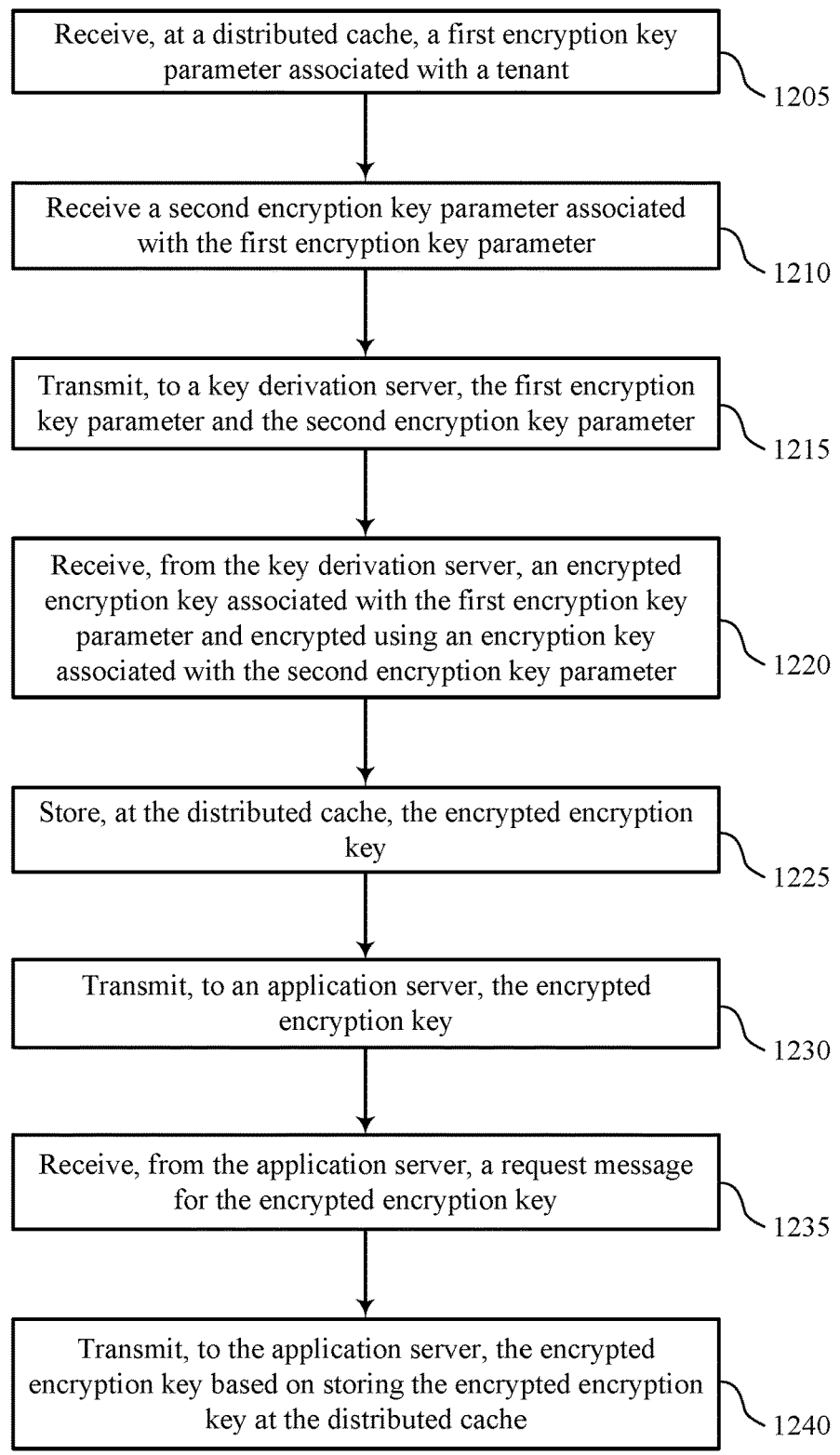

FIG. 12 shows a flowchart illustrating a method 1200 for distributed key caching for encrypted keys in accordance with aspects of the present disclosure. The operations of method 1200 may be implemented by a distributed cache (e.g., a distributed cache 230, 315, or 415) or its components as described herein. For example, the operations of method 1200 may be performed by a distributed cache key caching manager as described with reference to FIGS. 5 through 7. In some examples, a distributed cache may execute a set of codes to control the functional elements of the device to perform the functions described below. Additionally or alternatively, the distributed cache may perform aspects of the functions described below using special-purpose hardware.

At block 1205 the distributed cache may receive, at a distributed cache, a first encryption key parameter associated with a tenant. The operations of block 1205 may be performed according to the methods described herein. In certain examples, aspects of the operations of block 1205 may be performed by a key retrieval component as described with reference to FIGS. 5 through 7.

At block 1210 the distributed cache may receive a second encryption key parameter associated with the first encryption key parameter. The operations of block 1210 may be performed according to the methods described herein. In certain examples, aspects of the operations of block 1210 may be performed by a key retrieval component as described with reference to FIGS. 5 through 7.

At block 1215 the distributed cache may transmit, to a key derivation server, the first encryption key parameter and the second encryption key parameter. The operations of block 1215 may be performed according to the methods described herein. In certain examples, aspects of the operations of block 1215 may be performed by a key derivation component as described with reference to FIGS. 5 through 7.

At block 1220 the distributed cache may receive, from the key derivation server, an encrypted encryption key associated with the first encryption key parameter and encrypted using an encryption key associated with the second encryption key parameter. The operations of block 1220 may be performed according to the methods described herein. In certain examples, aspects of the operations of block 1220 may be performed by a key derivation component as described with reference to FIGS. 5 through 7.

At block 1225 the distributed cache may store, at the distributed cache, the encrypted encryption key. The operations of block 1225 may be performed according to the methods described herein. In certain examples, aspects of the operations of block 1225 may be performed by a storage component as described with reference to FIGS. 5 through 7.

At block 1230 the distributed cache may transmit, to an application server, the encrypted encryption key. The operations of block 1230 may be performed according to the methods described herein. In certain examples, aspects of the operations of block 1230 may be performed by a key transmission component as described with reference to FIGS. 5 through 7.

At block 1235 the distributed cache may receive, from the application server, a request message for the encrypted encryption key. The operations of block 1235 may be performed according to the methods described herein. In certain examples, aspects of the operations of block 1235 may be performed by a warm cache component as described with reference to FIGS. 5 through 7.

At block 1240 the distributed cache may transmit, to the application server, the encrypted encryption key based at least in part on storing the encrypted encryption key at the distributed cache. The operations of block 1240 may be performed according to the methods described herein. In certain examples, aspects of the operations of block 1240 may be performed by a warm cache component as described with reference to FIGS. 5 through 7.

Figure 13:
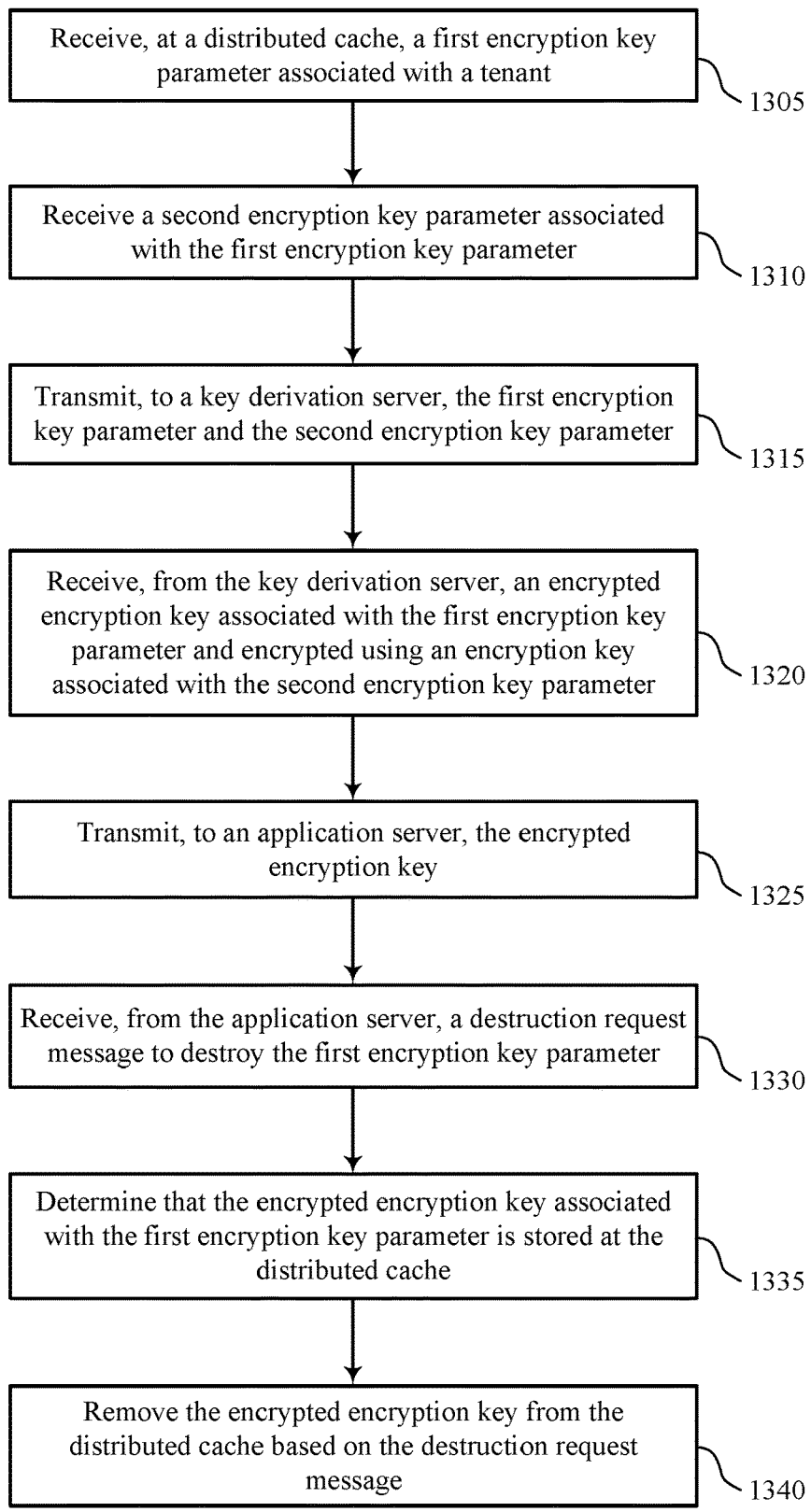

FIG. 13 shows a flowchart illustrating a method 1300 for distributed key caching for encrypted keys in accordance with aspects of the present disclosure. The operations of method 1300 may be implemented by a distributed cache (e.g., a distributed cache 230, 315, or 415) or its components as described herein. For example, the operations of method 1300 may be performed by a distributed cache key caching manager as described with reference to FIGS. 5 through 7. In some examples, a distributed cache may execute a set of codes to control the functional elements of the device to perform the functions described below. Additionally or alternatively, the distributed cache may perform aspects of the functions described below using special-purpose hardware.

At block 1305 the distributed cache may receive, at a distributed cache, a first encryption key parameter associated with a tenant. The operations of block 1305 may be performed according to the methods described herein. In certain examples, aspects of the operations of block 1305 may be performed by a key retrieval component as described with reference to FIGS. 5 through 7.

At block 1310 the distributed cache may receive a second encryption key parameter associated with the first encryption key parameter. The operations of block 1310 may be performed according to the methods described herein. In certain examples, aspects of the operations of block 1310 may be performed by a key retrieval component as described with reference to FIGS. 5 through 7.

At block 1315 the distributed cache may transmit, to a key derivation server, the first encryption key parameter and the second encryption key parameter. The operations of block 1315 may be performed according to the methods described herein. In certain examples, aspects of the operations of block 1315 may be performed by a key derivation component as described with reference to FIGS. 5 through 7.

At block 1320 the distributed cache may receive, from the key derivation server, an encrypted encryption key associated with the first encryption key parameter and encrypted using an encryption key associated with the second encryption key parameter. The operations of block 1320 may be performed according to the methods described herein. In certain examples, aspects of the operations of block 1320 may be performed by a key derivation component as described with reference to FIGS. 5 through 7.

At block 1325 the distributed cache may transmit, to an application server, the encrypted encryption key. The operations of block 1325 may be performed according to the methods described herein. In certain examples, aspects of the operations of block 1325 may be performed by a key transmission component as described with reference to FIGS. 5 through 7.

At block 1330 the distributed cache may receive, from the application server, a destruction request message to destroy the first encryption key parameter. The operations of block 1330 may be performed according to the methods described herein. In certain examples, aspects of the operations of block 1330 may be performed by a key destruction component as described with reference to FIGS. 5 through 7.

At block 1335 the distributed cache may determine that the encrypted encryption key associated with the first encryption key parameter is stored at the distributed cache. The operations of block 1335 may be performed according to the methods described herein. In certain examples, aspects of the operations of block 1335 may be performed by a key destruction component as described with reference to FIGS. 5 through 7.

At block 1340 the distributed cache may remove the encrypted encryption key from the distributed cache based at least in part on the destruction request message. The operations of block 1340 may be performed according to the methods described herein. In certain examples, aspects of the operations of block 1340 may be performed by a key destruction component as described with reference to FIGS. 5 through 7.

Figure 14:
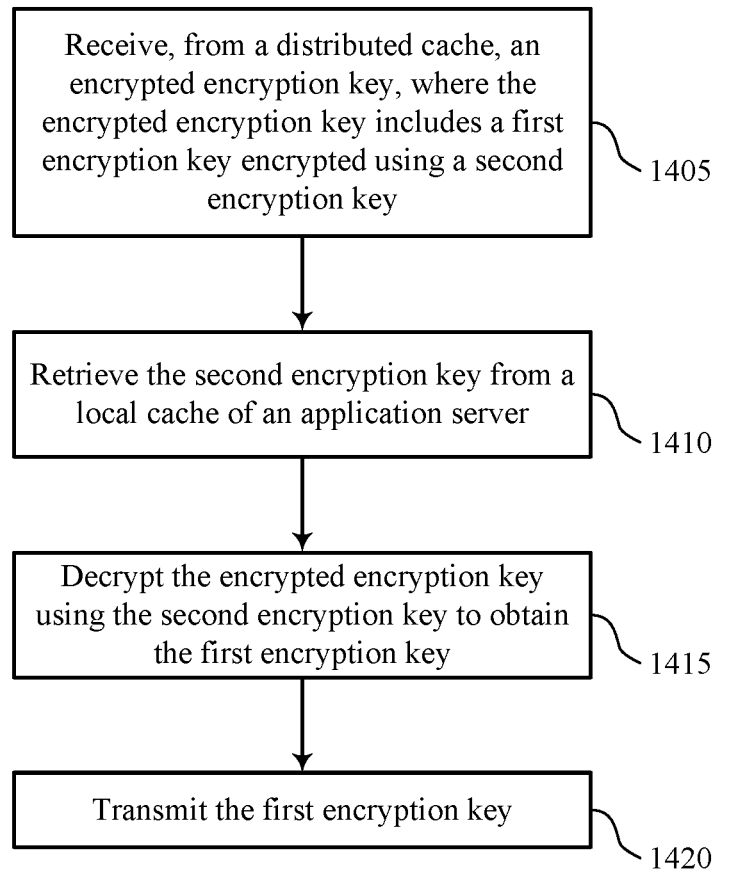

FIG. 14 shows a flowchart illustrating a method 1400 for distributed key caching for encrypted keys in accordance with aspects of the present disclosure. The operations of method 1400 may be implemented by an application server (e.g., an application server 220, 310, or 410) or its components as described herein. For example, the operations of method 1400 may be performed by an application server key caching manager as described with reference to FIGS. 8 through 10. In some examples, an application server may execute a set of codes to control the functional elements of the device to perform the functions described below. Additionally or alternatively, the application server may perform aspects of the functions described below using special-purpose hardware.

At block 1405 the application server may receive, from a distributed cache, an encrypted encryption key, wherein the encrypted encryption key comprises a first encryption key encrypted using a second encryption key. The operations of block 1405 may be performed according to the methods described herein. In certain examples, aspects of the operations of block 1405 may be performed by an encrypted key receiver as described with reference to FIGS. 8 through 10.

At block 1410 the application server may retrieve the second encryption key from a local cache of an application server. The operations of block 1410 may be performed according to the methods described herein. In certain examples, aspects of the operations of block 1410 may be performed by a key retrieval component as described with reference to FIGS. 8 through 10.

At block 1415 the application server may decrypt the encrypted encryption key using the second encryption key to obtain the first encryption key. The operations of block 1415 may be performed according to the methods described herein. In certain examples, aspects of the operations of block 1415 may be performed by a decryption component as described with reference to FIGS. 8 through 10.

At block 1420 the application server may transmit the first encryption key. The operations of block 1420 may be performed according to the methods described herein. In certain examples, aspects of the operations of block 1420 may be performed by a key transmission component as described with reference to FIGS. 8 through 10.

Figure 15:
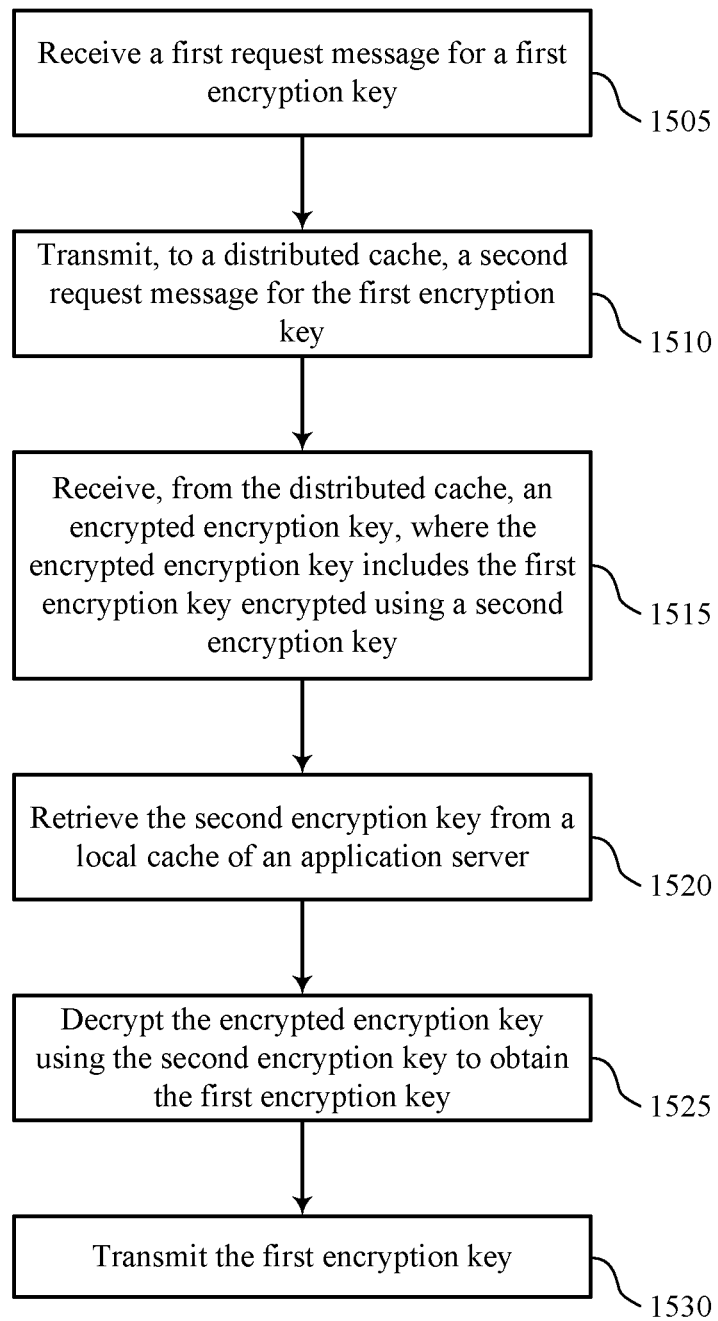

FIG. 15 shows a flowchart illustrating a method 1500 for distributed key caching for encrypted keys in accordance with aspects of the present disclosure. The operations of method 1500 may be implemented by an application server (e.g., an application server 220, 310, or 410) or its components as described herein. For example, the operations of method 1500 may be performed by an application server key caching manager as described with reference to FIGS. 8 through 10. In some examples, an application server may execute a set of codes to control the functional elements of the device to perform the functions described below. Additionally or alternatively, the application server may perform aspects of the functions described below using special-purpose hardware.

At block 1505 the application server may receive a first request message for a first encryption key. The operations of block 1505 may be performed according to the methods described herein. In certain examples, aspects of the operations of block 1505 may be performed by a key request component as described with reference to FIGS. 8 through 10.

At block 1510 the application server may transmit, to a distributed cache, a second request message for the first encryption key. The operations of block 1510 may be performed according to the methods described herein. In certain examples, aspects of the operations of block 1510 may be performed by a key request component as described with reference to FIGS. 8 through 10.

At block 1515 the application server may receive, from the distributed cache, an encrypted encryption key, wherein the encrypted encryption key comprises the first encryption key encrypted using a second encryption key. The operations of block 1515 may be performed according to the methods described herein. In certain examples, aspects of the operations of block 1515 may be performed by an encrypted key receiver as described with reference to FIGS. 8 through 10.

At block 1520 the application server may retrieve the second encryption key from a local cache of an application server. The operations of block 1520 may be performed according to the methods described herein. In certain examples, aspects of the operations of block 1520 may be performed by a key retrieval component as described with reference to FIGS. 8 through 10.

At block 1525 the application server may decrypt the encrypted encryption key using the second encryption key to obtain the first encryption key. The operations of block 1525 may be performed according to the methods described herein. In certain examples, aspects of the operations of block 1525 may be performed by a decryption component as described with reference to FIGS. 8 through 10.

At block 1530 the application server may transmit the first encryption key. The operations of block 1530 may be performed according to the methods described herein. In certain examples, aspects of the operations of block 1530 may be performed by a key transmission component as described with reference to FIGS. 8 through 10.

Figure 16:
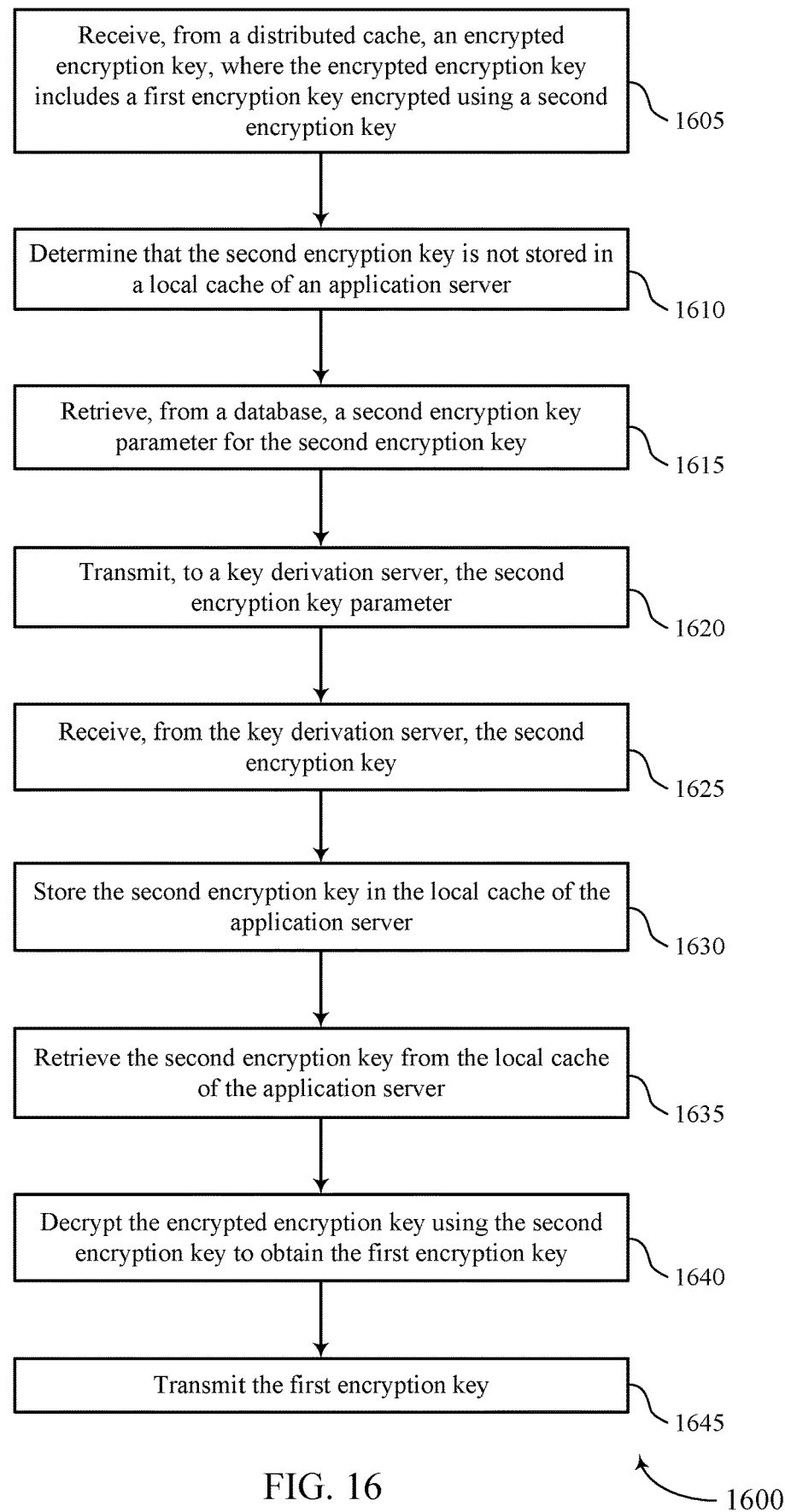

FIG. 16 shows a flowchart illustrating a method 1600 for distributed key caching for encrypted keys in accordance with aspects of the present disclosure. The operations of method 1600 may be implemented by an application server (e.g., an application server 220, 310, or 410) or its components as described herein. For example, the operations of method 1600 may be performed by an application server key caching manager as described with reference to FIGS. 8 through 10. In some examples, an application server may execute a set of codes to control the functional elements of the device to perform the functions described below. Additionally or alternatively, the application server may perform aspects of the functions described below using special-purpose hardware.

At block 1605 the application server may receive, from a distributed cache, an encrypted encryption key, wherein the encrypted encryption key comprises a first encryption key encrypted using a second encryption key. The operations of block 1605 may be performed according to the methods described herein. In certain examples, aspects of the operations of block 1605 may be performed by an encrypted key receiver as described with reference to FIGS. 8 through 10.

At block 1610 the application server may determine that the second encryption key is not stored in a local cache of an application server. The operations of block 1610 may be performed according to the methods described herein. In certain examples, aspects of the operations of block 1610 may be performed by a cache searching component as described with reference to FIGS. 8 through 10.

At block 1615 the application server may retrieve, from a database, a second encryption key parameter for the second encryption key. The operations of block 1615 may be performed according to the methods described herein. In certain examples, aspects of the operations of block 1615 may be performed by a key parameter retrieval component as described with reference to FIGS. 8 through 10.

At block 1620 the application server may transmit, to a key derivation server, the second encryption key parameter. The operations of block 1620 may be performed according to the methods described herein. In certain examples, aspects of the operations of block 1620 may be performed by a key derivation component as described with reference to FIGS. 8 through 10.

At block 1625 the application server may receive, from the key derivation server, the second encryption key. The operations of block 1625 may be performed according to the methods described herein. In certain examples, aspects of the operations of block 1625 may be performed by a key derivation component as described with reference to FIGS. 8 through 10.

At block 1630 the application server may store the second encryption key in the local cache of the application server. The operations of block 1630 may be performed according to the methods described herein. In certain examples, aspects of the operations of block 1630 may be performed by a storage component as described with reference to FIGS. 8 through 10.

At block 1635 the application server may retrieve the second encryption key from the local cache of the application server based at least in part on the storing. The operations of block 1635 may be performed according to the methods described herein. In certain examples, aspects of the operations of block 1635 may be performed by a key retrieval component as described with reference to FIGS. 8 through 10.

At block 1640 the application server may decrypt the encrypted encryption key using the second encryption key to obtain the first encryption key. The operations of block 1640 may be performed according to the methods described herein. In certain examples, aspects of the operations of block 1640 may be performed by a decryption component as described with reference to FIGS. 8 through 10.

At block 1645 the application server may transmit the first encryption key. The operations of block 1645 may be performed according to the methods described herein. In certain examples, aspects of the operations of block 1645 may be performed by a key transmission component as described with reference to FIGS. 8 through 10.

A method of data encryption is described. The method may include receiving, at a distributed cache, a first encryption key parameter associated with a tenant and a second encryption key parameter associated with the first encryption key parameter. The method may further include transmitting, to a key derivation server, the first encryption key parameter and the second encryption key parameter, and receiving, from the key derivation server, an encrypted encryption key associated with the first encryption key parameter and encrypted using an encryption key associated with the second encryption key parameter. Additionally, the method may include transmitting, to an application server, the encrypted encryption key.

An apparatus for data encryption is described. The apparatus may include a processor, memory in electronic communication with the processor, and instructions stored in the memory. The instructions may be operable to cause the processor to receive, at a distributed cache, a first encryption key parameter associated with a tenant and a second encryption key parameter associated with the first encryption key parameter. The instructions may be further operable to cause the processor to transmit, to a key derivation server, the first encryption key parameter and the second encryption key parameter, and to receive, from the key derivation server, an encrypted encryption key associated with the first encryption key parameter and encrypted using an encryption key associated with the second encryption key parameter. Additionally, the instructions may be further operable to cause the processor to transmit, to an application server, the encrypted encryption key.

Some examples of the method and apparatus described above may further include processes, features, means, or instructions for storing, at the distributed cache, the encrypted encryption key. Some examples of the method and apparatus described above may further include processes, features, means, or instructions for receiving, from the application server, a request message for the encrypted encryption key. Some examples of the method and apparatus described above may further include processes, features, means, or instructions for transmitting, to the application server, the encrypted encryption key based at least in part on storing the encrypted encryption key at the distributed cache.

Some examples of the method and apparatus described above may further include processes, features, means, or instructions for receiving, from the application server, a destruction request message to destroy the first encryption key parameter. Some examples of the method and apparatus described above may further include processes, features, means, or instructions for determining that the encrypted encryption key associated with the first encryption key parameter is stored at the distributed cache. Some examples of the method and apparatus described above may further include processes, features, means, or instructions for removing the encrypted encryption key from the distributed cache based at least in part on the destruction request message.

In some examples of the method and apparatus described above, receiving the first encryption key parameter comprises receiving the first encryption key parameter from a database.

Some examples of the method and apparatus described above may further include processes, features, means, or instructions for receiving, from the application server, a first destruction request message to destroy the first encryption key parameter. Some examples of the method and apparatus described above may further include processes, features, means, or instructions for sending, to the database, a second destruction request message to remove the first encryption key parameter from the database.

In some examples of the method and apparatus described above, receiving the first encryption key parameter comprises receiving, from a user, the first encryption key parameter as a user input.

Some examples of the method and apparatus described above may further include processes, features, means, or instructions for receiving, from the application server, a request message associated with the first encryption key parameter. Some examples of the method and apparatus described above may further include processes, features, means, or instructions for sending, to the user, a call out message requesting the first encryption key parameter based at least in part on the request message, wherein receiving, from the user, the first encryption key parameter may be based at least in part on the call out message.

In some examples of the method and apparatus described above, the first encryption key parameter may be received from the user based at least in part on an upload periodicity or an upload schedule.

Some examples of the method and apparatus described above may further include processes, features, means, or instructions for sending, to the user, a first call out message requesting the first encryption key parameter, wherein receiving, from the user, the first encryption key parameter may be based at least in part on the first call out message. Some examples of the method and apparatus described above may further include processes, features, means, or instructions for sending, to the user, a second call out message requesting an updated encryption key parameter based at least in part on a time-to-live parameter or a destruction request message received from the user.

Some examples of the method and apparatus described above may further include processes, features, means, or instructions for determining whether the first encryption key parameter comprises a tenant-specific encryption key or a tenant secret based at least in part on metadata associated with the user input. In some examples of the method and apparatus described above, the encrypted encryption key may be encrypted using a key wrap algorithm.

A further method of data encryption is described. The method may include receiving, from a distributed cache, an encrypted encryption key, wherein the encrypted encryption key comprises a first encryption key encrypted using a second encryption key. The method may further include retrieving the second encryption key from a local cache of an application server, decrypting the encrypted encryption key using the second encryption key to obtain the first encryption key, and transmitting the first encryption key.

Another apparatus for data encryption is described. The apparatus may include a processor, memory in electronic communication with the processor, and instructions stored in the memory. The instructions may be operable to cause the processor to receive, from a distributed cache, an encrypted encryption key, wherein the encrypted encryption key comprises a first encryption key encrypted using a second encryption key. The instructions may be further operable to cause the processor to retrieve the second encryption key from a local cache of an application server, decrypt the encrypted encryption key using the second encryption key to obtain the first encryption key, and transmit the first encryption key.

Some examples of the method and apparatus described above may further include processes, features, means, or instructions for receiving a first request message for the first encryption key. Some examples of the method and apparatus described above may further include processes, features, means, or instructions for transmitting, to the distributed cache, a second request message for the first encryption key.

Some examples of the method and apparatus described above may further include processes, features, means, or instructions for determining that the second encryption key is not stored in the local cache of the application server. Some examples of the method and apparatus described above may further include processes, features, means, or instructions for retrieving, from a database, a second encryption key parameter for the second encryption key. Some examples of the method and apparatus described above may further include processes, features, means, or instructions for transmitting, to a key derivation server, the second encryption key parameter. Some examples of the method and apparatus described above may further include processes, features, means, or instructions for receiving, from the key derivation server, the second encryption key. Some examples of the method and apparatus described above may further include processes, features, means, or instructions for storing the second encryption key in the local cache of the application server, wherein retrieving the second encryption key may be based at least in part on the storing.

Some examples of the method and apparatus described above may further include processes, features, means, or instructions for receiving a first destruction request message for the first encryption key. Some examples of the method and apparatus described above may further include processes, features, means, or instructions for sending, to the distributed cache, a second destruction request message for the first encryption key based at least in part on the first destruction request message.

Some examples of the method and apparatus described above may further include processes, features, means, or instructions for removing the second encryption key from the local cache based at least in part on an LRU algorithm. In some examples of the method and apparatus described above, the first encryption key comprises a DEK. Additionally or alternatively, in some examples of the method and apparatus described above, the second encryption key comprises a KEK.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data encryption, comprising:
  receiving, from an application server, a data encryption key request at a distributed cache;
  receiving, from a central database and at the distributed cache, an encryption key parameter corresponding to a user based at least in part on the data encryption key request;
  transmitting an additional data encryption key request to a key derivation server, the additional data encryption key request comprising the encryption key parameter and triggering a key derivation procedure;
  receiving, at the distributed cache as a result of the key derivation procedure, a first encryption key that is encrypted by a second encryption key, wherein the second encryption key is inaccessible by the distributed cache;
  transmitting the first encryption key that is encrypted by the second encryption key to an application server remote from the distributed cache based at least in part on receiving the data encryption key request;
  receiving, from the application server, a destruction request message to destroy the encryption key parameter; and
  removing, based at least in part on the destruction request message, the first encryption key that is stored at a key cache associated with the distributed cache and encrypted by the second encryption key.

2. The method of claim 1, further comprising:
  determining that the key cache associated with the distributed cache does not contain the first encryption key; and
  storing the first encryption key that is encrypted by the second encryption key in the key cache associated with the distributed cache based at least in part on receiving the first encryption key that is encrypted by the second encryption key.

3. The method of claim 1, further comprising:
  transmitting an encryption key parameter request to a database; and
  receiving the encryption key parameter from the database based at least in part on transmitting the encryption key parameter request.

4. The method of claim 3, wherein the database corresponds to the central database and the encryption key parameter corresponds to a tenant secret.

5. The method of claim 1, wherein receiving the encryption key parameter comprises receiving, from a user device, the encryption key parameter as a user input.

6. The method of claim 3, further comprising:
  receiving, from the application server, a first destruction request message to destroy the encryption key parameter; and
  sending, to the database, a second destruction request message to remove the encryption key parameter from the database.

7. The method of claim 5, wherein the encryption key parameter is received from the user device based at least in part on an upload periodicity or an upload schedule.

8. The method of claim 5, further comprising:
  sending, to the user device, a first call out message requesting the encryption key parameter, wherein receiving, from the user device, the encryption key parameter is based at least in part on the first call out message; and
  sending, to the user device, a second call out message requesting an updated encryption key parameter based at least in part on a time-to-live parameter or the destruction request message received from the user device.

9. The method of claim 1, wherein the first encryption key is received in accordance with a transport layer security (TLS) protocol.

10. A method for data encryption, comprising:
  receiving a key request for a data encryption key at an application server;
  transmitting a request for the data encryption key to a distributed cache remote from the application server based at least in part on receiving the key request;
  receiving, from the distributed cache and based at least in part on transmitting the request for the data encryption key, a first encryption key that is encrypted by a second encryption key, the first encryption key corresponding to the data encryption key, wherein the second encryption key is inaccessible by the distributed cache;
retrieving the second encryption key from a local cache of the application server based at least in part on receiving the first encryption key that is encrypted by the second encryption key;
decrypting, using the retrieved second encryption key, the first encryption key that is encrypted by the second encryption key to obtain the data encryption key;
receiving, from the application server, a first destruction request message for the encryption key; and
sending, to the distributed cache, a second destruction request message to remove the first encryption key from a key cache associated with the distributed cache.

11. The method of claim 10, further comprising:
determining that the local cache contains the second encryption key;
transmitting an additional request to the local cache based at least in part on determining that the local cache contains the second encryption key; and
receiving the second encryption key from the local cache based at least in part on transmitting the additional request to the local cache.

12. The method of claim 10, further comprising:
determining that the local cache does not contain the second encryption key;
retrieving an encryption key parameter for the second encryption key from a database based at least in part on determining that the local cache does not contain the second encryption key;
transmitting the encryption key parameter to a key derivation server;
receiving the second encryption key from the key derivation server based at least in part on the encryption key parameter; and
storing the second encryption key in the local cache based at least in part on receiving the second encryption key from the key derivation server.

13. The method of claim 12, wherein the second encryption key is received from the key derivation server in accordance with a transport layer security (TLS) protocol.

14. The method of claim 10, further comprising:
removing the second encryption key from the local cache based at least in part on a least recently used (LRU) algorithm.

15. The method of claim 10, wherein:
the first encryption key comprises the data encryption key (DEK); and
the second encryption key comprises a key encryption key (KEK).

16. An apparatus for data encryption, comprising:
a processor;
memory in electronic communication with the processor; and
instructions stored in the memory and operable, when executed by the processor, to cause the apparatus to:
receive, from an application server, a data encryption key request at a distributed cache;
receive, from a central database and at the distributed cache, an encryption key parameter corresponding to a user based at least in part on the data encryption key request;
transmit an additional data encryption key request to a key derivation server, the additional data encryption key request comprising the encryption key parameter and triggering a key derivation procedure;
receive, at the distributed cache as a result of the key derivation procedure, a first encryption key that is encrypted by a second encryption key, wherein the second encryption key is inaccessible by the distributed cache;
transmit the first encryption key that is encrypted by the second encryption key to an application server remote from the distributed cache based at least in part on receiving the data encryption key request;
receive, from the application server, a destruction request message to destroy the encryption key parameter; and
remove, based at least in part on the destruction request message, the first encryption key that is stored at a key cache associated with the distributed cache and encrypted by the second encryption key.

17. The method of claim 1, further comprising:
sending, to a user device, a call out message requesting the encryption key parameter; and
receiving, from the user device, the encryption key parameter based at least in part on the call out message.

18. The method of claim 10, further comprising:
failing to receive the second encryption key from the distributed cache based at least in part on the second encryption key being inaccessible by the distributed cache, wherein retrieving the second encryption key from the local cache is based at least in part on failing to receive the second encryption key from the distributed cache.

* * * * *

UNITED STATES PATENT AND TRADEMARK OFFICE
CERTIFICATE OF CORRECTION

| | |
|---|---|
| PATENT NO. | : 11,700,112 B2 |
| APPLICATION NO. | : 16/863402 |
| DATED | : July 11, 2023 |
| INVENTOR(S) | : Hersans et al. |

It is certified that error appears in the above-identified patent and that said Letters Patent is hereby corrected as shown below:

On the Title Page

Item (71) For the Applicant "salesforce.com, inc." is deleted and replaced with --Salesforce, Inc.--.

Signed and Sealed this
Twelfth Day of September, 2023

Katherine Kelly Vidal
*Director of the United States Patent and Trademark Office*